(12) United States Patent
Scarborough

(10) Patent No.: US 6,941,672 B2
(45) Date of Patent: *Sep. 13, 2005

(54) TAPE MEASURE THAT INCORPORATES A WHEELED MARKING DEVICE FOR APPLYING A MARKING INDICIA

(75) Inventor: Dane Scarborough, Hailey, ID (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/758,387

(22) Filed: Jan. 14, 2004

(65) Prior Publication Data

US 2005/0178019 A1 Aug. 18, 2005

Related U.S. Application Data

(63) Continuation-in-part of application No. 10/753,924, filed on Jan. 6, 2004, now Pat. No. 6,910,280, and a continuation-in-part of application No. 10/197,050, filed on Jul. 15, 2002, now Pat. No. 6,701,636, and a continuation-in-part of application No. 10/196,984, filed on Jul. 15, 2002, now Pat. No. 6,637,125, and a continuation-in-part of application No. 10/195,945, filed on Jul. 15, 2002, now Pat. No. 6,701,635

(60) Provisional application No. 60/360,698, filed on Feb. 28, 2002, and provisional application No. 60/342,146, filed on Dec. 18, 2001.

(51) Int. Cl.[7] ................................................ G01B 3/10

(52) U.S. Cl. .............................. 33/761; 33/668; 33/42; 7/163

(58) Field of Search .................. 33/668, 755, 34–39.1, 33/759–761, 42, 768; 7/163; 30/276, 319, 347

(56) References Cited

U.S. PATENT DOCUMENTS

| | | | |
|---|---|---|---|
| 2,649,787 A | | 8/1953 | Kobayashi |
| 3,063,157 A | | 11/1962 | Keene |
| 3,526,964 A | | 9/1970 | Clark, Jr. |
| 3,646,885 A | * | 3/1972 | Kolody ........................... 33/36 |
| 3,731,389 A | | 5/1973 | King |
| 3,783,785 A | * | 1/1974 | Frank et al. .................... 33/36 |
| 4,015,337 A | | 4/1977 | Taylor |
| 4,372,049 A | * | 2/1983 | Hogue ........................... 33/36 |
| 4,439,927 A | | 4/1984 | Elliott |
| 4,542,589 A | | 9/1985 | Yamamoto |
| 4,551,847 A | * | 11/1985 | Caldwell ....................... 33/755 |
| 4,630,376 A | | 12/1986 | Pentecost |
| 4,649,649 A | | 3/1987 | Fain |
| 4,667,412 A | | 5/1987 | Carlson |
| 4,729,171 A | | 3/1988 | Samson |
| 4,760,648 A | | 8/1988 | Doak et al. |
| 4,965,941 A | | 10/1990 | Agostinacci |
| 4,989,326 A | | 2/1991 | O'Malley |
| 5,038,492 A | * | 8/1991 | Bryant et al. .................. 33/758 |
| 5,416,978 A | | 5/1995 | Kaufman |
| 5,430,952 A | | 7/1995 | Betts |
| 5,435,074 A | | 7/1995 | Holevas et al. |
| 5,477,619 A | | 12/1995 | Kearns |
| 5,505,133 A | | 4/1996 | Chen |
| 5,577,329 A | | 11/1996 | States |

(Continued)

FOREIGN PATENT DOCUMENTS

WO     WO02/08687     1/2002

*Primary Examiner*—Christopher W. Fulton
*Assistant Examiner*—Yaritza Guadalupe
(74) *Attorney, Agent, or Firm*—Stephen M. Nipper; Dykas, Shaver & Nipper

(57) ABSTRACT

A tape measure that incorporates a marking device for allowing an individual to measure and mark a wide variety of materials in a more efficient and economical manner, and for measuring and marking the beginning point of reference and the measured position point simultaneously. The tape measure has a housing, a coiled measuring tape, a tape tip, and a marker having a marking wheel mounted on an axle.

16 Claims, 30 Drawing Sheets

U.S. PATENT DOCUMENTS

| | | |
|---|---|---|
| 5,671,543 A | 9/1997 | Sears |
| 5,735,052 A | 4/1998 | Lin |
| 5,809,662 A | 9/1998 | Skinner |
| 5,815,939 A | 10/1998 | Ruffer |
| 5,829,152 A | 11/1998 | Potter et al. |
| 6,041,513 A | 3/2000 | Doak |
| 6,178,655 B1 | 1/2001 | Potter et al. |
| 6,212,787 B1 | 4/2001 | Dixon |
| 6,363,622 B1 | 4/2002 | Stratton |
| 6,612,046 B1 * | 9/2003 | Cimorell et al. ............... 33/668 |
| 6,789,329 B1 * | 9/2004 | Hester ......................... 33/760 |
| 2001/0029673 A1 | 10/2001 | Brown et al. |
| 2004/0123479 A1 * | 7/2004 | Tufts et al. ................... 33/768 |

* cited by examiner

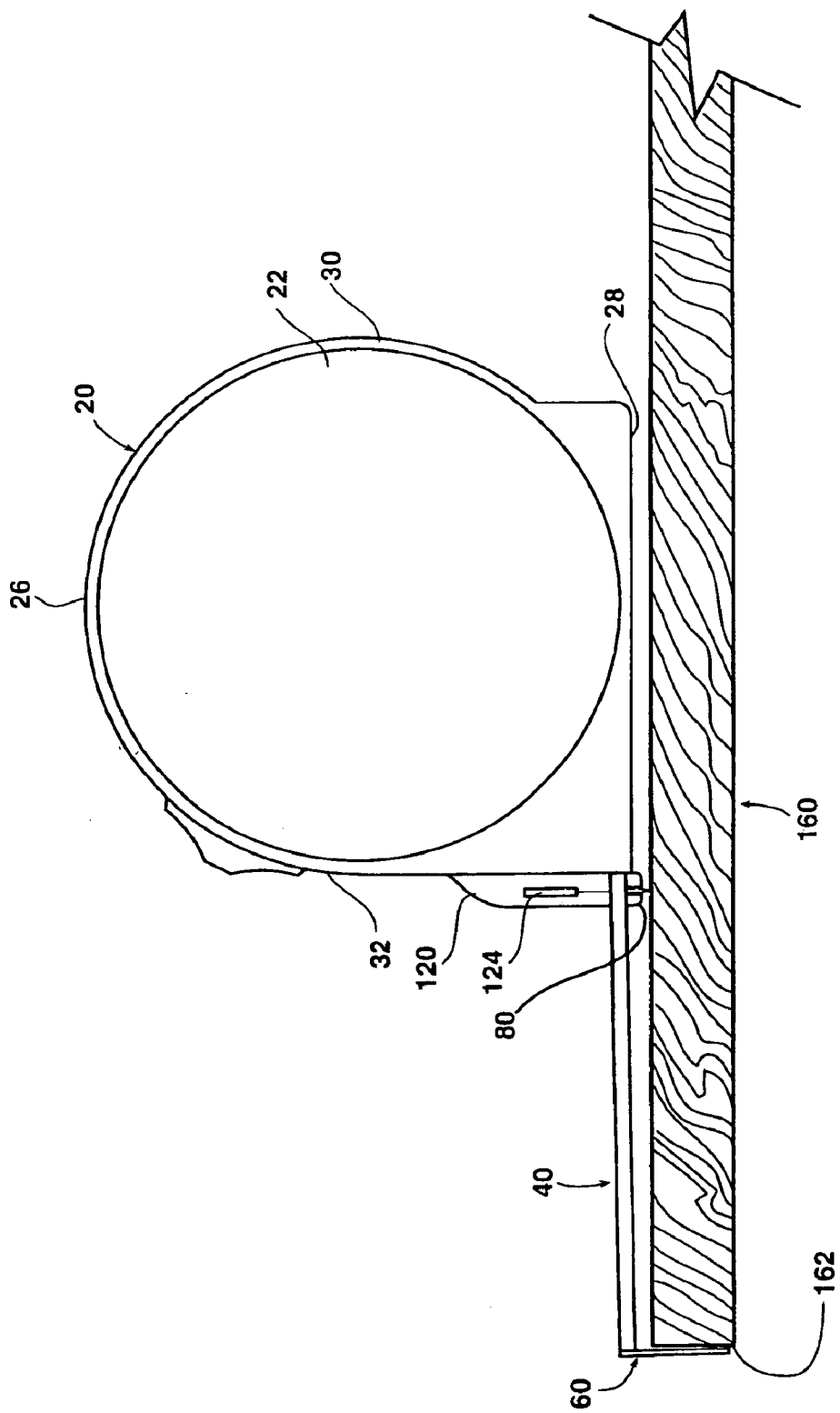

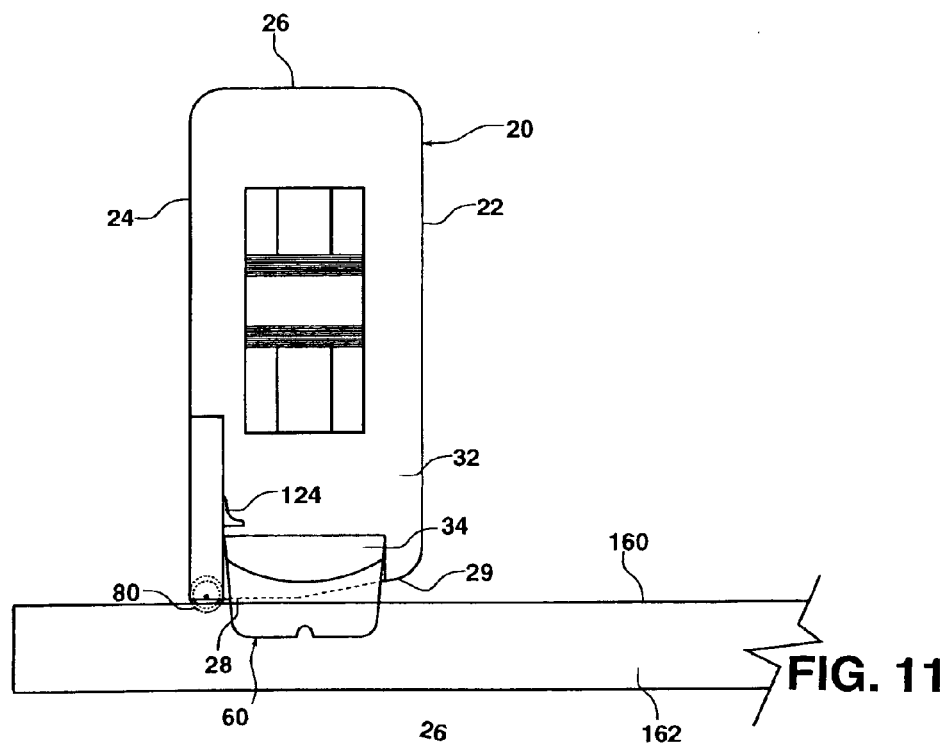
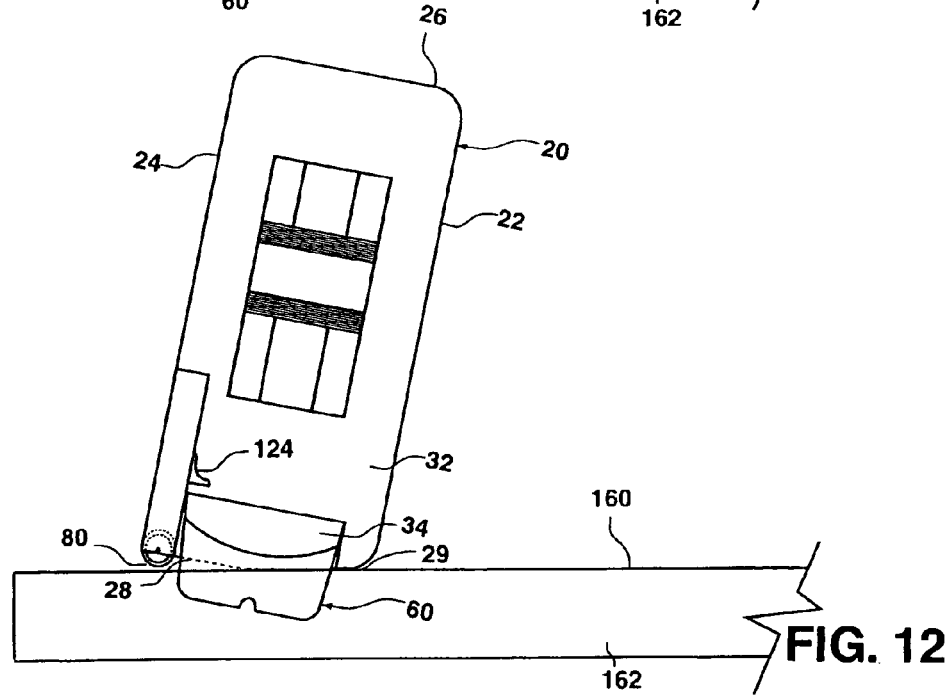

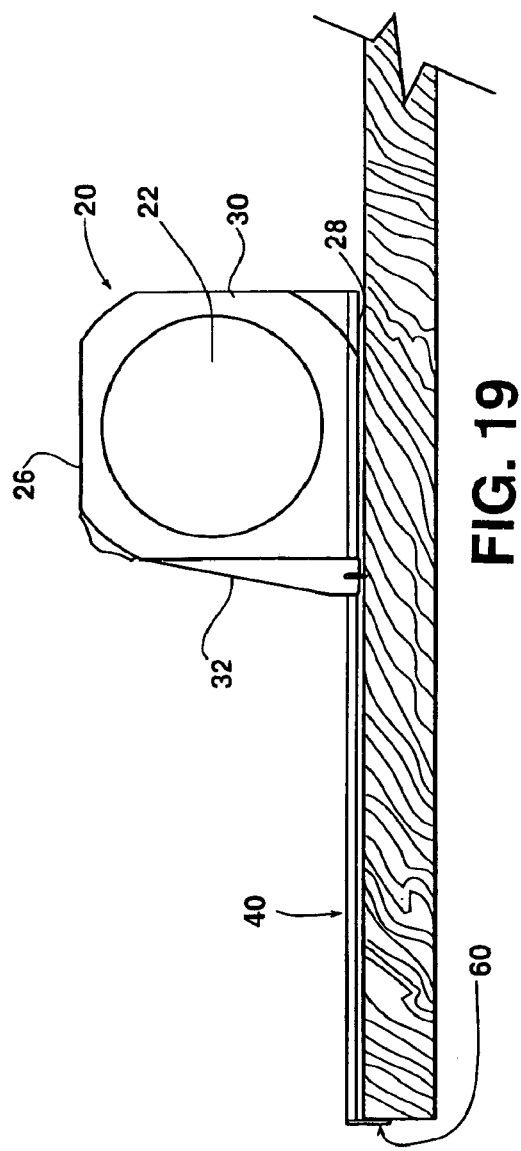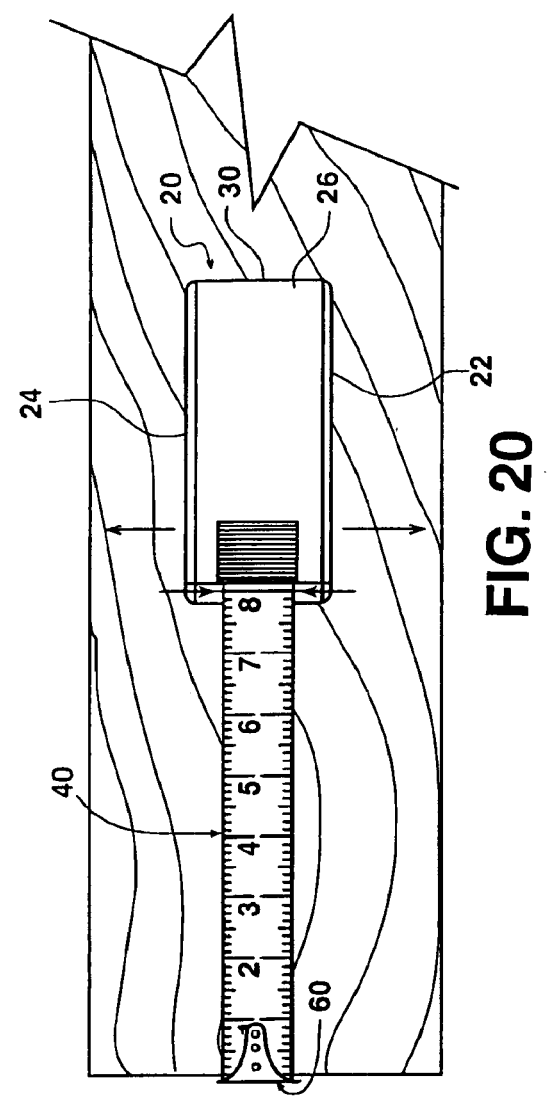

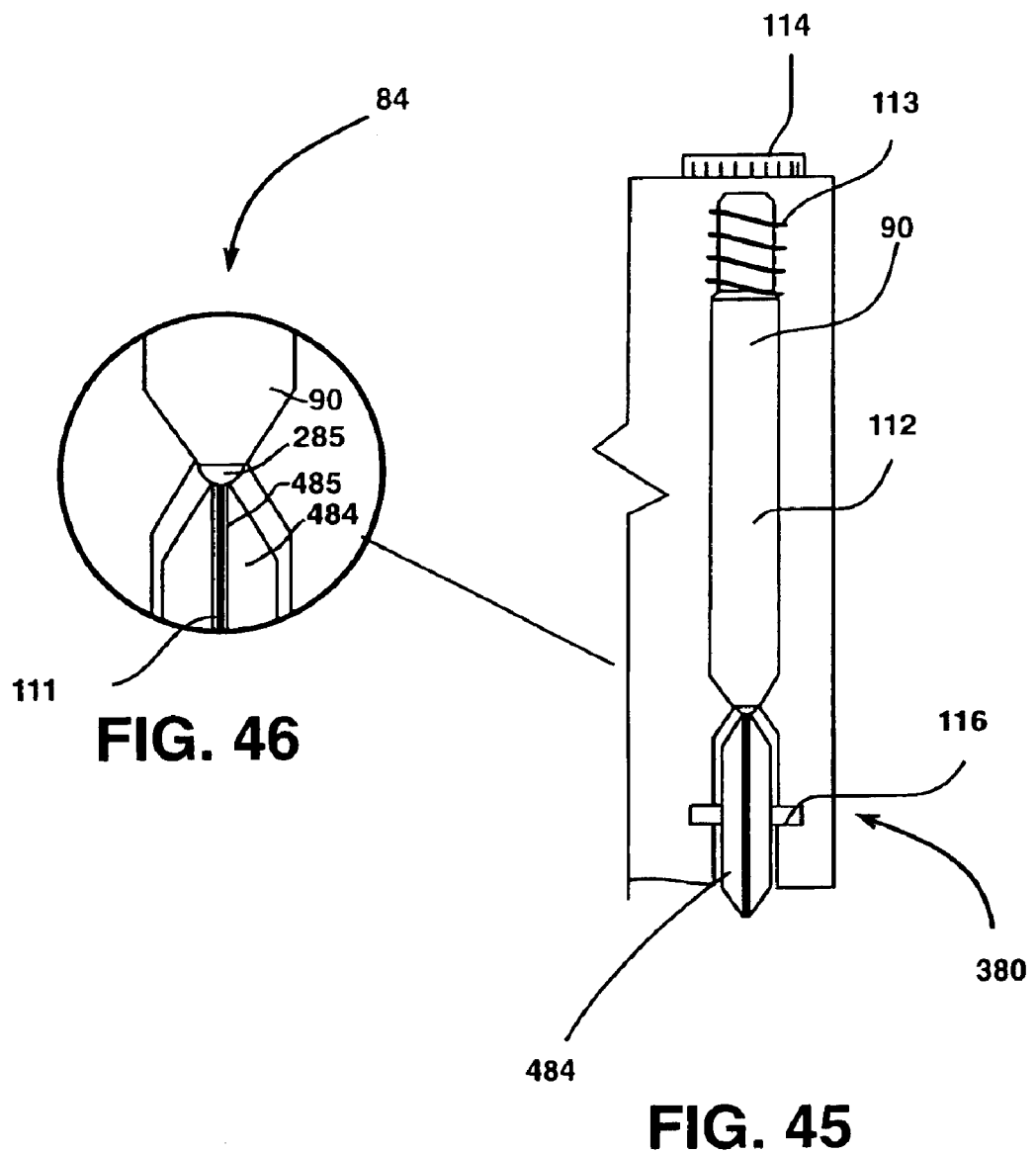

TAPE MEASURE THAT INCORPORATES A WHEELED MARKING DEVICE FOR APPLYING A MARKING INDICIA

PRIORITY

This application claims priority from application Ser. Nos. 10/195,924, 10/195,945 and 10/197,050, all of which claim priority from both the provisional application entitled "Tape Measure that Incorporates a Marking Device" filed by Dane Scarborough on Dec. 18, 2001, with Ser. No. 60/342,146, and the provisional application entitled "Tape Measure that Incorporates a Marking Device" filed by Dane Scarborough on Feb. 28, 2002 with Ser. No. 60/360,698. This application further claims priority from application Ser. No. 10/753,924, filed on Jan. 6, 2004 bearing the title "Tape Measure that Incorporates a Marking Device".

BACKGROUND OF THE INVENTION

1. Field of the Invention

The present invention relates generally to measuring devices and more specifically it relates to a tape measure that incorporates a marking device for allowing an individual to measure and mark a wide variety of materials in a more efficient and economical manner.

2. Description of the Prior Art

Various different forms and types of measuring devices are known to the prior art. One particular type of measuring device is known as a "tape measure." Tape measures typically comprise a flexible tape resiliently coiled within a housing. The tape is normally printed with incremental measuring marks for measuring distances. In use, the flexible tape is uncoiled and extended from the housing and placed on a surface to be measured. Distances can then be marked with a separate marking tool, such as a pencil, directly onto the surface measured.

Numerous devices incorporating marking tools inside and outside the tape measure housing are known in the prior art. These include devices which are affixed to existing tape measure housings, for instance, the self adhesive scoring attachment of U.S. Pat. No. 6,041,513 (Doak). These devices also include marking tools which are affixed to belt clips of existing tape measure housings. In example, U.S. Pat. No. 4,760,648 (Doak et al.) which discloses a marking device adapted to be mounted on one side of the tape measure, namely as a replacement belt clip.

These devices also include housings configured for receipt therethrough of marking means, such as pencils or pens. In example, U.S. Pat. No. 5,735,052 (Lin) discloses a tape measure having formed therein a passage for receiving therethrough the marking means.

These devices also include marking tools which are integral with the tape measure housing. For instance, U.S. Pat. No. 5,435,074 (Holevas et al.) discloses a tape measure having a marker attached to the tape measure's lock so that depression of the lock mechanism also extends the marker out of the housing of the tape measure. Also, U.S. Pat. No. 4,015,337 (Taylor) discloses a marking device integrally formed into the housing of the tape measure.

These devices can also include scoring means rather than marking (ink, graphite, etc.) means. For instance, U.S. Pat. No. 2,649,787 (Kobayashi), U.S. Pat. No. 3,063,157 (Keene), and U.S. Pat. No. 3,526,964 (Clark, Jr.).

The main problems with these conventional measuring devices are maintenance, inaccuracy, and lack of versatility. Prior art marking means include the use of pencils, pens, scribes, chalk, and/or crayons. These methods of marking require continued maintenance in the form of refilling, sharpening, and/or adjusting the height or position of the marking instrument. Every time these marking means are subject to routine maintenance, inaccuracies become possible.

Another disadvantage is the fact that these methods for marking are limited in the scope of materials they can mark. For example, it is difficult to use a pencil, pen, or scribe to mark glass or ceramic tile. Conversely, it would not be preferable to use a felt marker or pen to mark material that will receive a clear finish or a painted finish wherein the mark of the pen or marker may bleed through the finish.

Another problem with conventional measuring devices are the number of procedures required to complete the task of measuring and marking materials accurately. These prior art devices require that the tape measure blade be locked into position prior to the use of the marking device. For instance, the patent to Holevas et al. discussed above. Such use can require additional digital manipulation of the tape measure, and due to the contact of the locking mechanism to the blade, can cause the tape measure blade to shift from the desired position, thereby causing inaccuracies.

Other problems with conventional measuring devices are their size and complexity. Many prior art devices have protrusions that inhibit or eliminate the ability to carry the tape measure in the standard pouch or holder that is often provided on a carpenter's or tradesmen's tool belt. Furthermore, if the tip of the marking instrument is exposed, it can cause damage or harm to other objects, or it can be damaged itself.

Prior art measuring tapes with retractable marking instruments require a mechanical means to do so. This retraction means also requires additional moving parts, which increase cost, increase the number of procedures for use, as well as increase the probability of malfunction.

What is needed is a tape measure, or a marking device able to be utilized with a tape measure, which is readily able to allow an individual to measure and mark a wide variety of materials in an efficient and economical manner; can be used for measuring and marking both the beginning point of reference and the measured position point simultaneously; requires little to no maintenance; is not prone to inaccuracy; is versatile; can be used to mark a wide variety of materials; is simple to use; is compact and not awkwardly shaped; and/or is not prone to damage when in or out of use.

In these respects, a tape measure that incorporates a marking device according to the present invention substantially departs from the conventional concepts and designs of the prior art, and in so doing provides an apparatus primarily developed for the above needs.

SUMMARY OF THE INVENTION

In view of the foregoing disadvantages inherent in the known types of measuring devices found in the prior art, the present invention provides a new tape measure that incorporates a marking device construction wherein the same can be utilized for allowing an individual to measure and mark a wide variety of materials in a more efficient and economical manner. Another purpose of the present invention is for measuring and marking the beginning point of reference and the measured position point simultaneously.

The general purpose of the present invention, which will be described subsequently in greater detail, is to provide a new tape measure that improves on the teachings of the prior art. In doing so, the present invention has many of the advantages of the measuring devices mentioned heretofore, and many novel features. The result is a new tape measure that incorporates a marking device which is not anticipated, rendered obvious, suggested, or even implied by any of the prior art measuring devices, either alone or in any combination thereof.

The preferred embodiment of the present invention generally comprises a housing, a coiled measuring tape, a tape tip, and a marker for applying a mark to a surface to be measured and marked.

In the preferred embodiment, the housing is preferably an elongated square or cylindrical shape or a combination thereof, having opposed side walls, a top wall, a bottom wall, a rear wall, and a front wall defining an enclosure. The front wall having therethrough a tape blade aperture. The bottom wall or a portion thereof may be angled in such a way as to allow for engagement of the tape tip to the surface being measured without initiating contact of the marking portion until it is intended.

The coiled measuring tape is an elongated blade formed of a ribbon of metal or composite material coiled on a means for a spool with a means to retract. The tape tip of the measuring tape attaches to the end of the measuring tape and preferably comprises a means for hooking, including a hook portion that extends at an essentially right angle from the mounting portion of the tape tip. The tape tip may include a mark making means that is separate and independent from the marking portion on the housing. The marking portion on the housing preferably has a circular shaped wheel made of a rigid material such as metal, plastic or a mark making composite. The wheel preferably has an aperture for mating with an axle. This axle is preferably an elongated cylindrical shape.

The holder embodiment or marker enclosure is preferably an elongated tubular square in shape. It has a means of attachment to the housing in one embodiment. In another embodiment, the marker enclosure is integral with said housing. It preferably has a protruding cursor that is in alignment with a means for holding a marking wheel parallel to the face of the housing and perpendicular to the tape. The means for locking the tape blade has a button section that protrudes to the exterior of the housing.

There has thus been outlined, rather broadly, the more important features of the invention so that the detailed description thereof may be better understood, and so that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a tape measure that incorporates a marking device that will overcome the shortcomings of the prior art devices, preferably either through an improved tape measure or an attachment for an existing tape measure.

An object of the present invention is to provide a tape measure that incorporates a marking device for allowing an individual to measure and mark a wide variety of materials in a more efficient and economical manner.

Another purpose of the present invention is for measuring and marking the beginning point of reference and the measured position point simultaneously.

Another object is to provide a tape measure that incorporates a marking device that is directional by nature when engaged with a surface to be measured.

Another object is to provide a tape measure that incorporates a marking device that can measure and mark two positions simultaneously.

Another object is to provide a tape measure that incorporates a marking device that does not require maintenance to the marking device.

Another object is to provide a tape measure that incorporates a marking device that can measure and mark with one hand operation in a single economical movement.

Another object is to provide a tape measure that incorporates a marking device that once engaged with the material being measured, will accurately hold its position while the mark is being made, without the use of an optional mechanical locking device.

Another object is to provide a tape measure that incorporates a marking device that can fit into a common tape pouch or holder on a carpenter's tool belt.

Another object is to provide a tape measure that incorporates a marking device that can engage material to be measured and marked without damaging the material to be marked.

Another object is to provide a tape measure that incorporates a marking device that in one embodiment, has no moving parts.

Another object is to provide a tape measure that incorporates a marking device that is interchangeable and/or replaceable with an optional marking portion.

Another object is to provide a tape measure that incorporates a marking device that can cut a variety of materials.

Another purpose is for measuring and marking the beginning point of reference and the measured position point simultaneously.

To the accomplishment of the above and related objects, embodiments of this invention may be embodied in the form illustrated in the accompanying drawings, attention being called to the fact, however, that the drawings are illustrative only, and that changes may be made in the specific construction illustrated. Embodiments of the present invention accomplish one or more of the above purposes.

Further, the purpose of the foregoing abstract is to enable the United States Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measure by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustraion of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

Various other objects, features and advantages of the present invention will become fully appreciated as the same becomes better understood when considered in conjunction with the accompanying drawings, in which like reference characters designate the same or similar parts throughout the several views.

FIG. 10 is a side environmental view of the embodiment shown in FIG. 6 engaging material to be marked.

FIG. 11 is a front view of a third embodiment of the present invention in position to measure.

FIG. 12 is a front view of the embodiment shown in FIG. 11 in position to mark.

FIG. 19 is a side view of a sixth embodiment of the present invention engaged with a surface to be measured and marked.

FIG. 20 is an overhead view of the embodiment shown in FIG. 19 engaged with a surface to be measured and marked.

FIG. 45 is a partial, side view of the embodiment of FIG. 45.

FIG. 46 is a partial, close up view of the embodiment of FIG. 45.

DESCRIPTION OF THE PREFERRED EMBODIMENT

Figure 1:
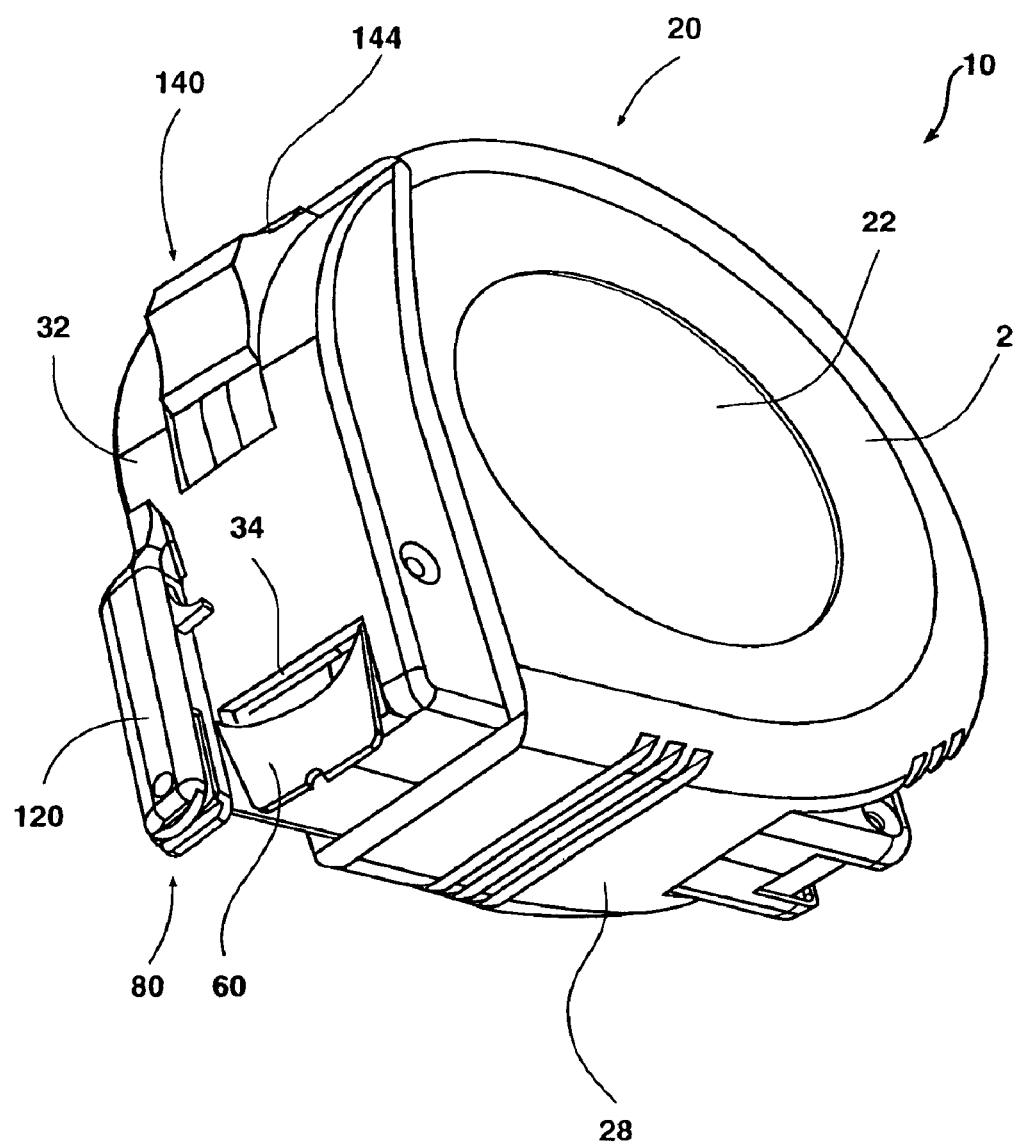
FIG. 1 is a perspective view of one embodiment of the present invention.
Figure 2:
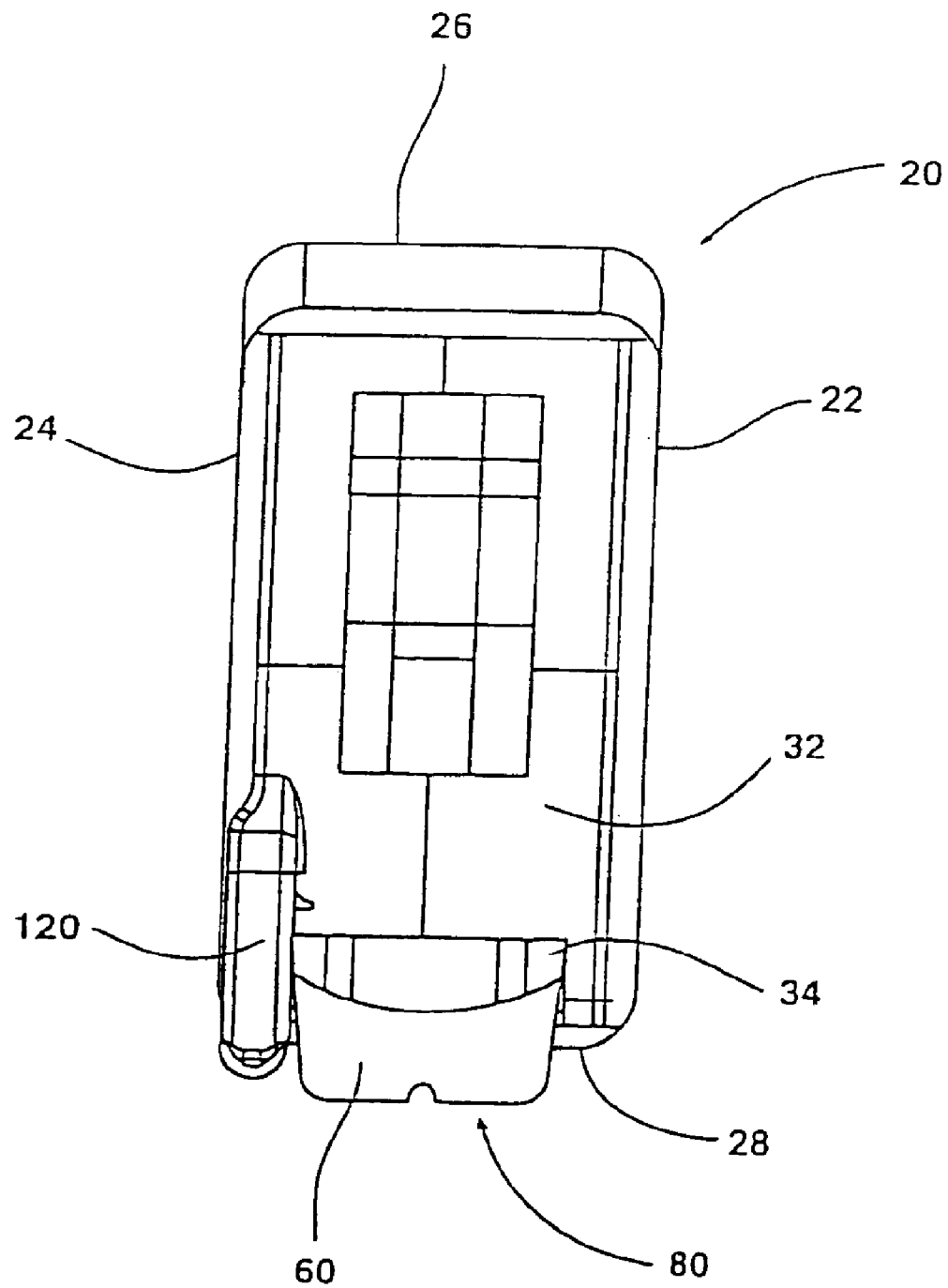
FIG. 2 is a front view of the embodiment shown in FIG. 1.
Figure 3:
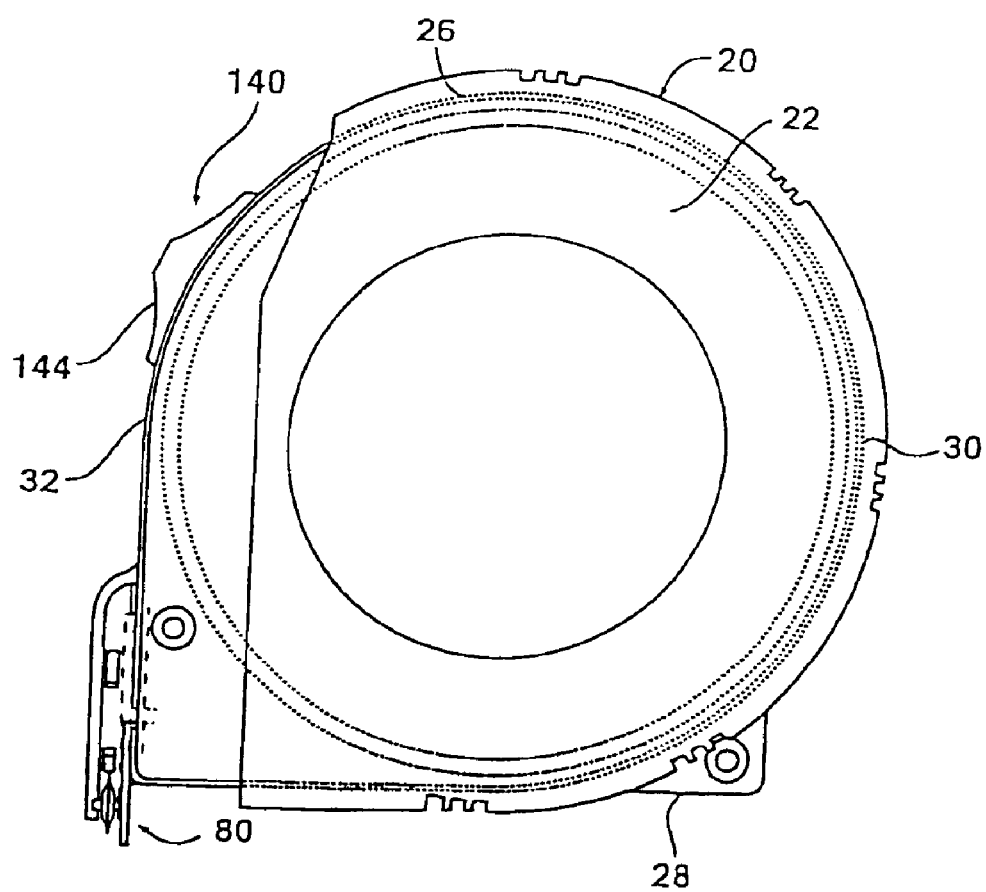
FIG. 3 is a side view of the embodiment shown in FIG. 1.
Figure 4:
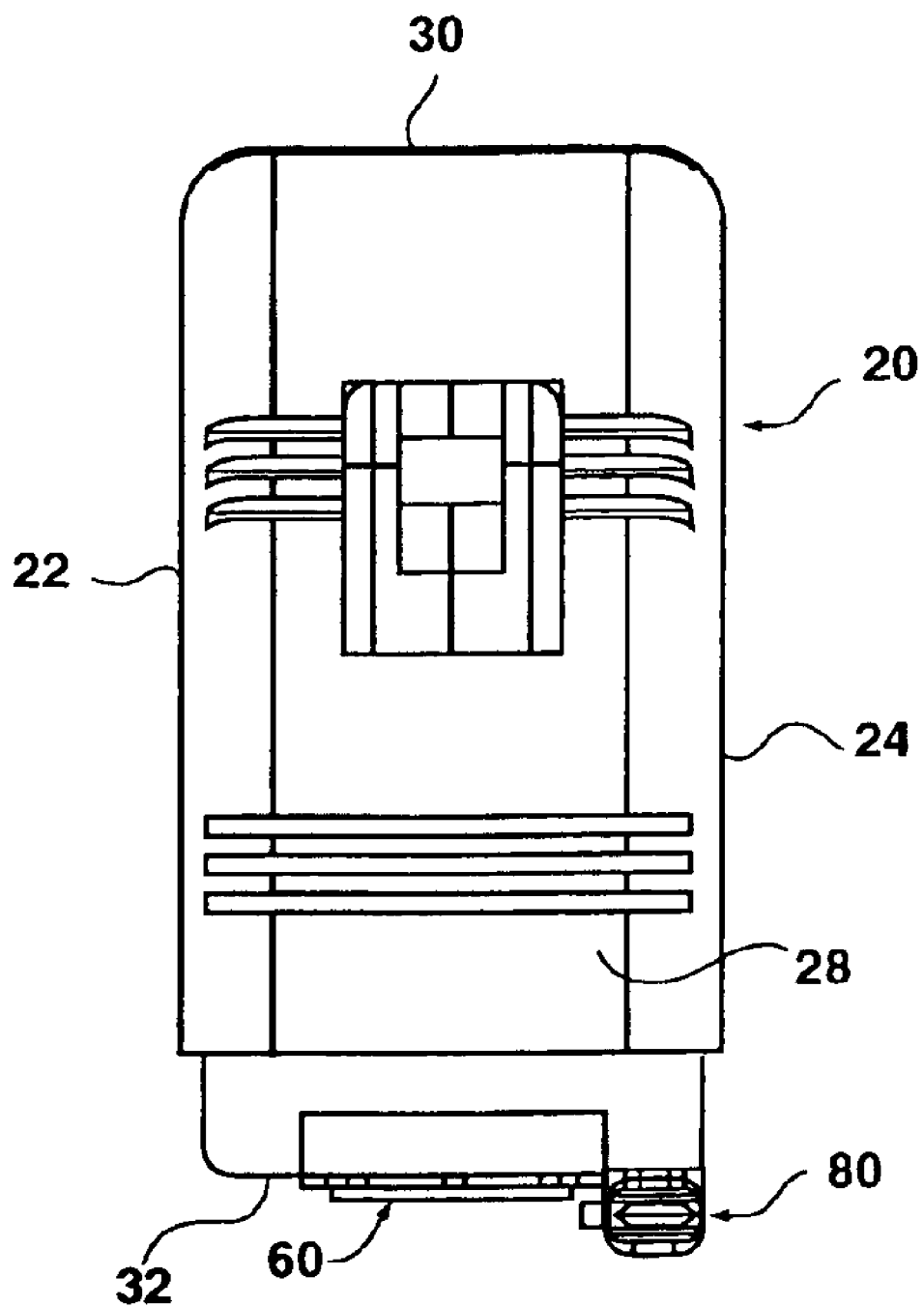
FIG. 4 is a bottom view of the embodiment shown in FIG. 1.

While the invention is susceptible of various modifications and alternative constructions, certain illustrated embodiments thereof have been shown in the drawings and will be described below in detail. It should be understood, however, that there is no intention to limit the invention to the specific forms or embodiments disclosed, but, on the contrary, the invention is to cover all modifications, alternative constructions, and equivalents falling within the spirit and scope of the invention as defined in the claims.

Turning now descriptively to the drawings in which similar reference characters denote similar elements throughout the several views, the attached figures illustrate embodiments of the present invention. In one embodiment, the present invention is a tape measure that incorporates a marking device. In another embodiment, the present invention comprises a marking device able to be attached to a tape measure.

Referring initially to FIGS. 1–5, shown is one embodiment of the present invention 10. This embodiment comprises a tape measure 2 incorporating a marking portion or "marking device" 80. This improved tape measure comprising a housing 20, a coiled measuring tape 40 having measuring indicia thereon, a tape tip 60, a marking device or marking portion 80, an axle 100, an "enclosure" or holder 120, and a means for locking the tape blade 140. The present invention is configured to be used upon a surface to be measured and marked 160.

The housing 20 is preferably an elongated square, a cylindrical shape or a combination thereof, as shown in the figures. Many different shapes and styles of tape measure housings are known to the prior art and may be configured for use with the present invention. The preferred housing 20 having opposed side walls 22, 24, a top wall 26, a bottom wall or base 28, a rear wall 30, and a front wall 32. These walls defining an enclosure for holding a wound tape blade. The front wall 32 having a tape blade aperture 34 therethrough for allowing a measuring tape blade to be extended.

In the preferred embodiment, the coiled measuring tape 40 is an elongated blade formed of a ribbon of metal or composite material coiled on a spooling means, such as a spool, with a retraction means, such as a spring mechanism. Such type of coiled blade with spring tape measures are common in the prior art. The tape tip 60 or means for hooking is able to hook onto the edge of the surface to be marked, such as the edge of a board. This tape tip preferably including a hook portion 62 that extends at an essentially right angle from the mounting portion 66 of the tape tip 60. The use of the phrase "coiled measuring tape" is expressly intended to include all other means for measuring, including laser, proximity sensors, sonar, etc.

The holder or enclosure 120 of the marking portion 80 is preferably generally elongated square in shape or a combination thereof or any other shape that would effectively house a marking device. In some embodiments, the holder 120 comprises a means of attachment to the housing, whereas, in other embodiments the holder 120 may be integrally formed within the housing 20 of the tape measure. In the embodiment shown in FIG. 1, the marking device 80 attaches to the housing 20 at the front wall 32. In such a configuration, the rim 88 of the impression wheel 84 extends from the housing. 20 in position to contact the surface to be marked adjacent the portion of the tape extending out of the housing, thereby allowing a user to mark the surface corresponding to a desired indicia marking on the tape of the tape measure.

Figure 5:
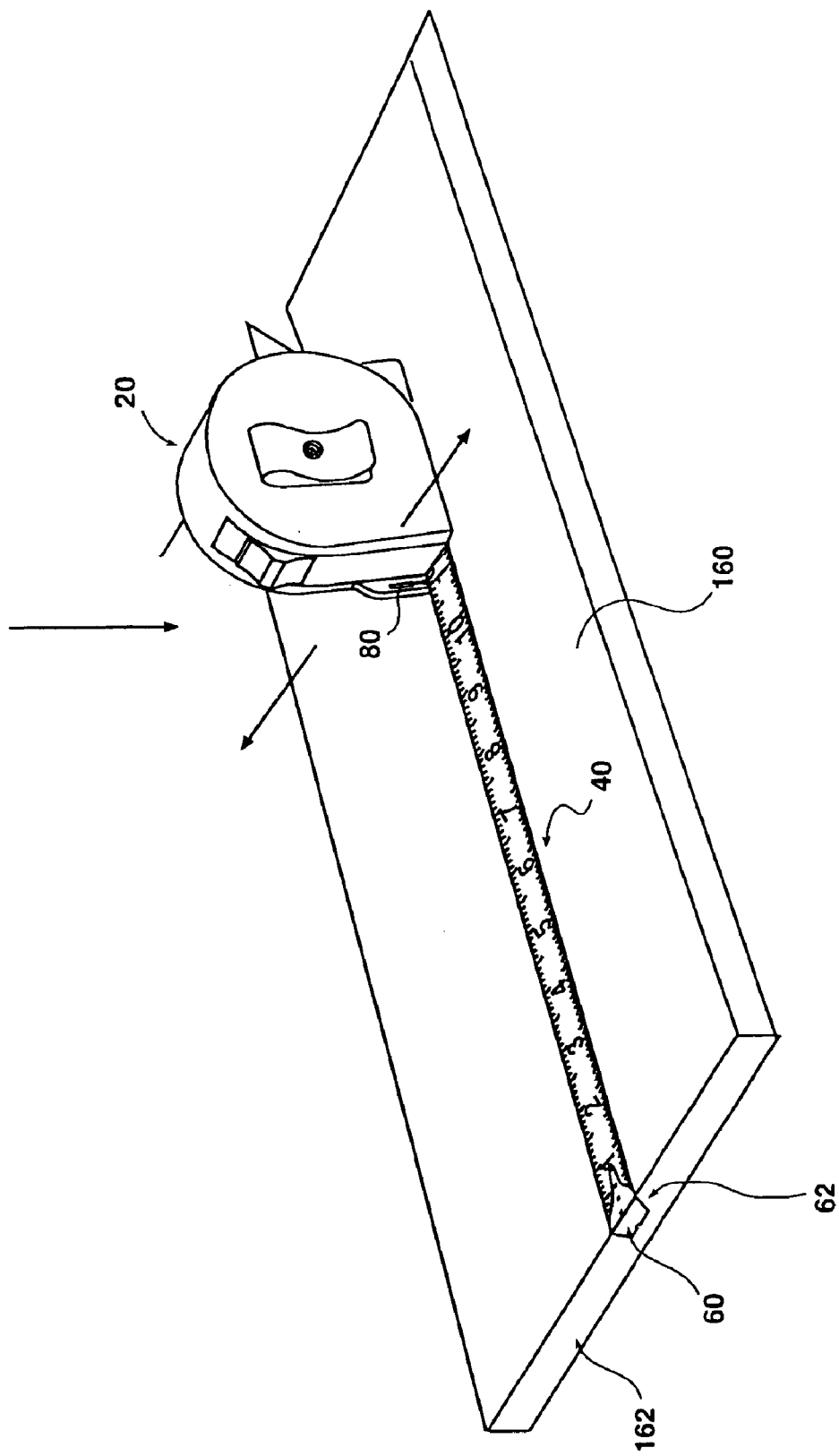
FIG. 5 is an environmental perspective view of the embodiment shown in FIG. 1.

In use, particularly as shown in FIG. 5, the tape tip 60 is hooked on the edge 162 of the surface to be measured 160. The housing 20 then moved away from the edge 162 thereby extending the tape 40. Side-to-side movement of the housing at the desired mark location results in the marking portion 80 making a mark on the surface to be measured and marked 162 which is generally perpendicular to the axis of the length of the tape 40, this mark correlating to a particular measurement position on the tape.

As shown in FIGS. 25–30, the holder 120 may also have a protruding cursor 124 that is in alignment with the marking wheel or "impression wheel" 84 of the marking portion 80. Thus, the cursor 124 gives the user of the present invention an indication of where the marking wheel 84 of the marking portion 80 is aligned, thereby indicating the alignment of the mark to be made by the marking portion.

Referring back to FIGS. 1–5, the present invention 10 preferably also comprises a means for locking 140 the tape blade 40 in position. This means for locking 140 has a button section 144 that protrudes to the exterior of the housing 20. Means for locking tape blades of tape measures, in general, are known in the prior art. The means for locking 140 is completely optional, in that the present invention, unlike many of the prior art devices, will work absent such a means for locking. This is due to the fact that the marking portion 80 is directional, able to create generally a straight line mark generally perpendicular to the extension of the measuring means. Thus, once the marking portion is placed against the surface to be marked at the location of the mark to be made, the tape itself does not need to be locked into place, but could even be retracted. The present invention is superior over the prior art in that the marking process is as easy as extending the housing to the point to be marked, and marking the surface to be marked. No additional steps are required, for instance, the lock does not need to be engaged or the marking portion engaged. Each additional step required can result in errors or variances in location of the marking portion from the point intended to be marked. The present invention, in eliminating these additional steps, thereby results in a more accurate measurement.

It is preferred that the housing of the present invention be made of a rigid material such as metal, plastic, rubber, composite or a combination thereof. It is preferred that the tape blade of the present invention be made of a resilient material, such as metal, plastic or a composite. It is preferred that the marking wheel be made of a material able to itself leave or create a mark upon or into the surface to be marked. For instance, the wheel could be made of a hard metal, such as steel. The marking wheel could likewise be made of different materials for the different purposes discussed within this application, including, but not limited to metal, composites, rubber, plastic, natural materials, foam, etc. Likewise, the shape of the marking wheel can be as necessary, including but not limited to: rounded, flat, angled, sharpened, solid, porous, etc.

Referring now to FIG. 5, the tape tip of the present invention preferably includes a means for hooking the tape tip on the edge 162 of a surface to be measured 160. This means for hooking having a hook portion 62 that extends at an essentially right angle from the mounting portion 66 of the tape tip 60. Such tape tips are standard for tape measures in the prior art.

Figure 15:
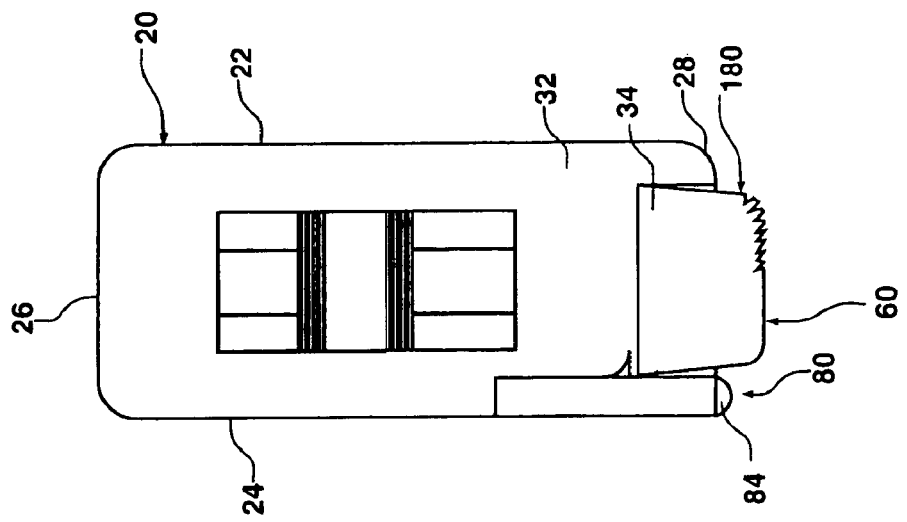
FIG. 15 is a front view of a fourth embodiment of the present invention.
Figure 17:
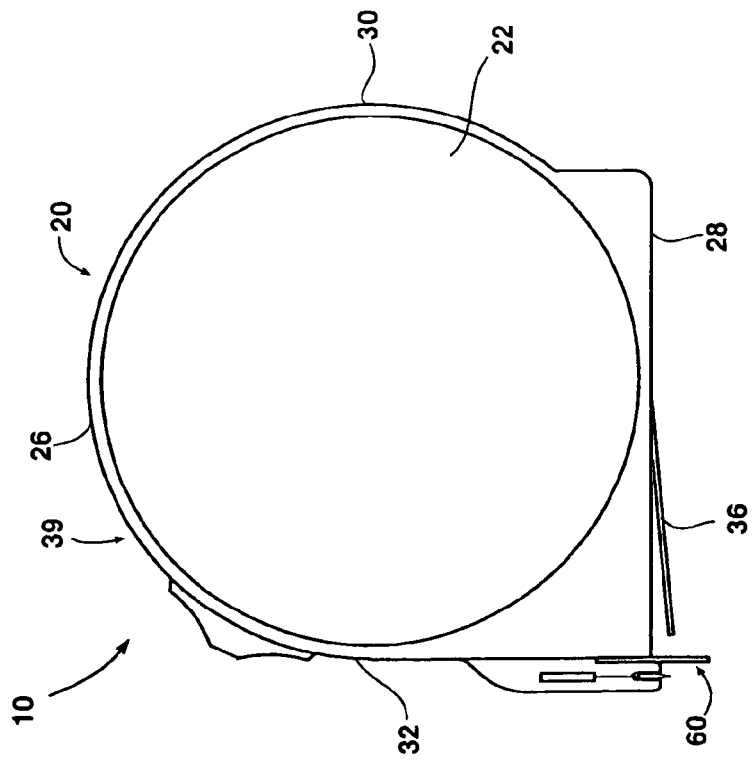
FIG. 17 is a front view of a fifth embodiment of the present invention showing a dual marking portion with a flexible housing bottom.
Figure 22:
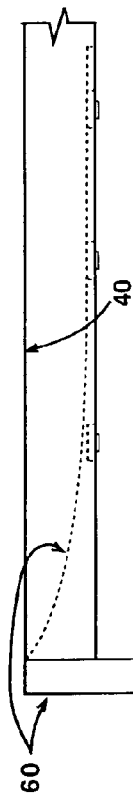
FIG. 22 is a side, close-up view of a tape tip containing a marking portion of one embodiment of the present invention.
Figure 23:
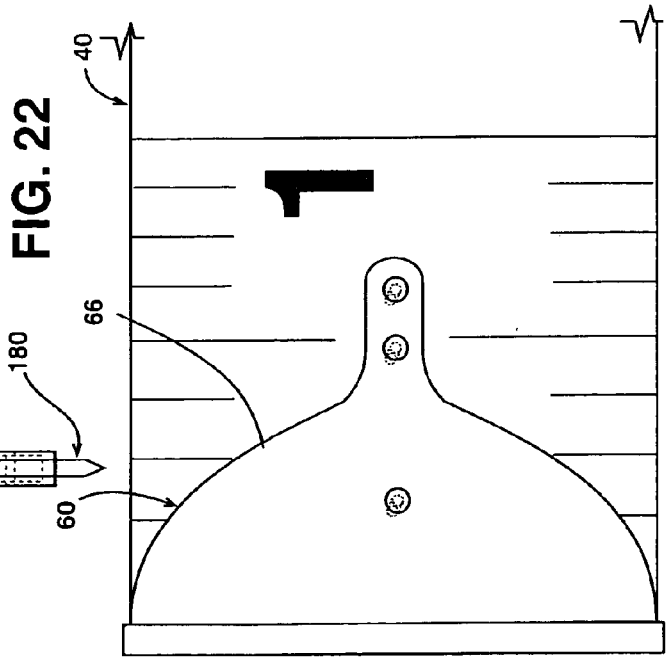
FIG. 23 is an overhead view of a tape tip of some embodiment of the present invention.

Referring now to FIGS. 22–23, the tape tip 60 comprises a means for hooking including a hooking portion 62 that extends at an essentially right angle from the mounting portion 66 of the tape tip 60. Preferably, the tape tip 60 extends below the bottom 28 of the housing, as shown in FIG. 17 to allow the hooking part 62 to easily engage the edge 162 of the surface to be measured and marked 160. As seen in FIG. 15, the tape tip 60 may be of an asymmetrical shape to allow for increased engagement of the tape tip 60 to the surface to be measured and marked 160.

Figure 16:
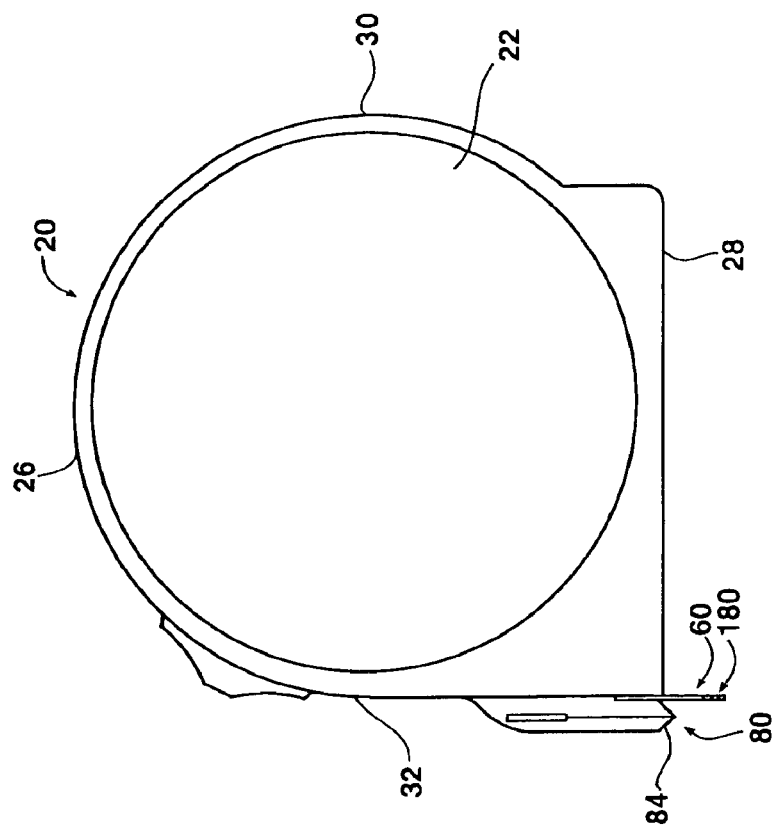
FIG. 16 is a side view of the embodiment shown in FIG. 15.

Optionally, the tape tip 60 may include a mark making means 180, for instance as shown in FIGS. 15–16, 22–23. In FIGS. 15 and 16, the marking portion 80 may be a serrated edge or the edge of the tape tip 60 itself may be embedded with a mark making means such as diamond particles or a means for leaving a mark. Whereas in FIGS. 21–23, the tape tip 60 itself may include a mark making means 180.

Figure 21:
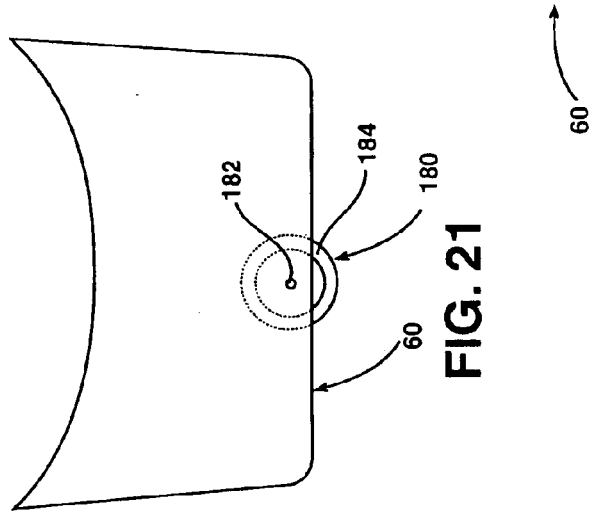
FIG. 21 is a front, close-up view of a tape tip containing a marking portion of one embodiment of the present invention.

In FIGS. 21–23, the marking portion 180 preferably comprises a circular shaped wheel 184 or portion thereof. It is preferred that the marking portion 180 be made of a rigid material such as metal, plastic or a mark making composite. One example material is magnesium. While the marking portion 180 does leave an mark on the surface to be marked, it is important that the marking portion 180 not be easily consumed or worn, for instance as a graphite pencil would be. Thus, it is preferred that the marking portion leave a mark, score, or cut the surface rather than itself being readily consumed through its contact with the surface. Example metals which leave a mark without being consumed include, but are not limited to: magnesium, magnesium alloys, etc.

Figure 33:
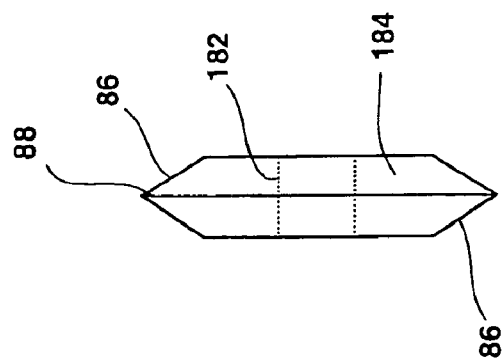
FIG. 33 is a front view of the marking portion shown in FIG. 31.
Figure 32:
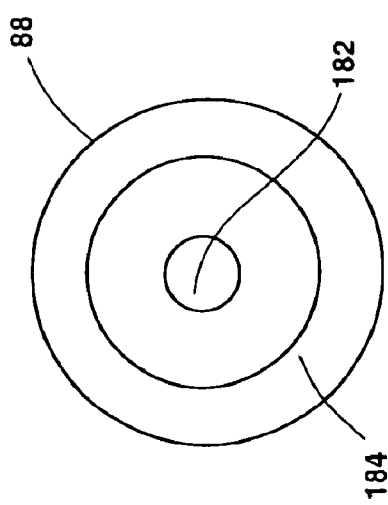
FIG. 32 is a side view of the marking portion shown in FIG. 31.
Figure 31:
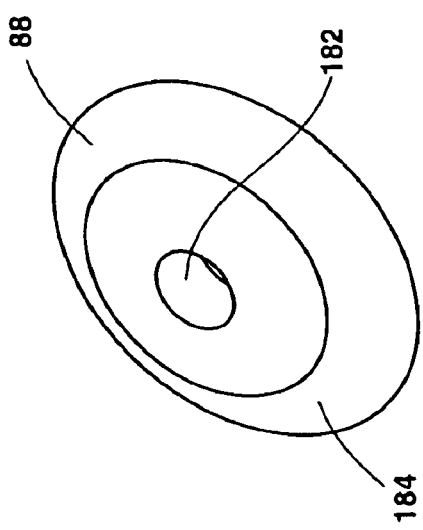
FIG. 31 is a perspective view of one embodiment of the marking portion.

The wheel 184 preferably has an aperture 182 for mating with an axle. The axle 100 is preferably an elongated cylindrical shape. Likewise, this tape tip 60 has a hooking portion 62 and a mounting portion 66. This marking portion 180 able to be configured for applying a mark as any other marking portion 80, 180 disclosed herein. The preferred embodiment of a wheel 184 utilized with the present invention can be found in FIGS. 31–33. The wheel 84 of the present invention may be likewise shaped.

Figure 7:
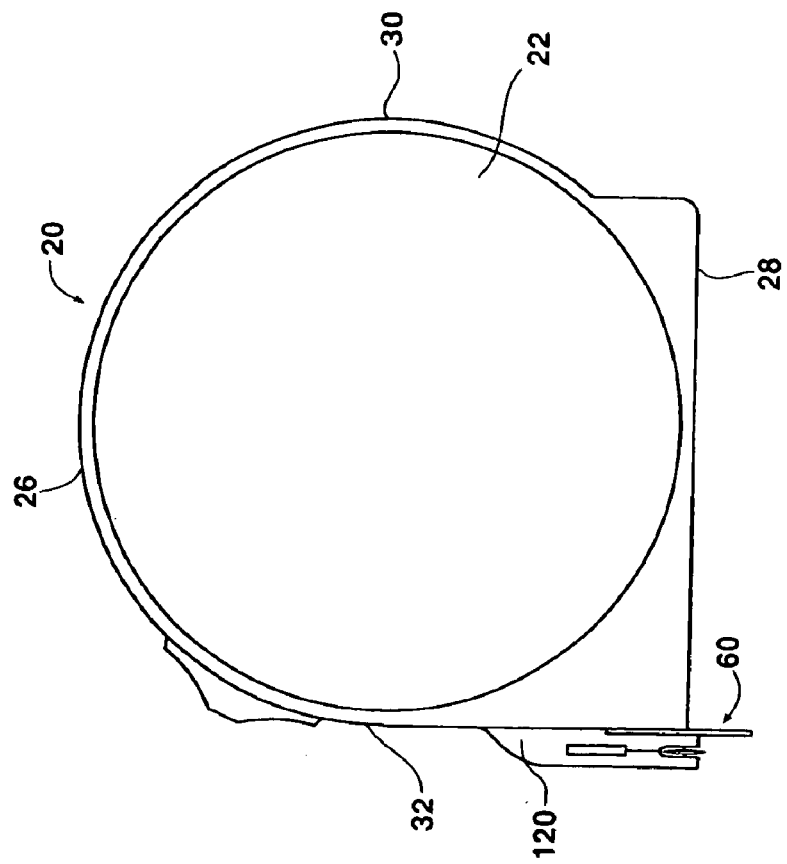
FIG. 7 is a side view of the embodiment shown in FIG. 6.
Figure 6:
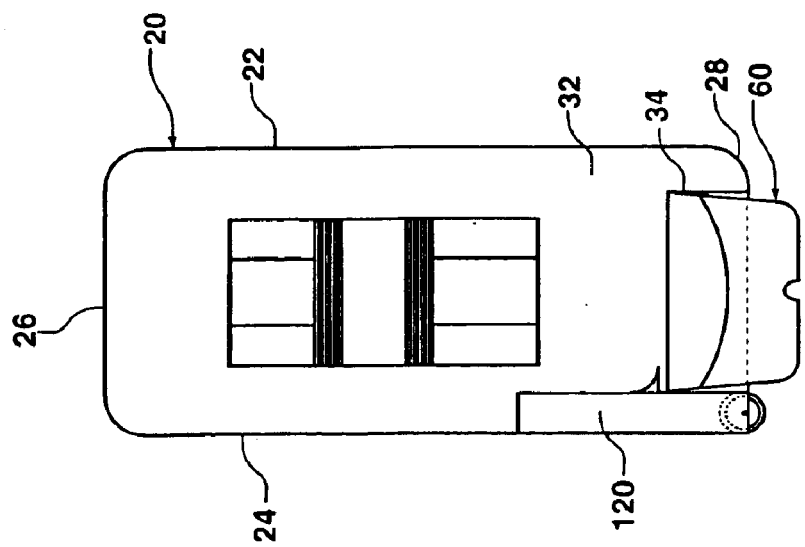
FIG. 6 is a front view of a second embodiment of the present invention.

Referring now to FIGS. 6–7, shown is another embodiment of the present invention. This embodiment having a housing 20, a tape blade aperture 34, and a tape terminating in a tape tip 60. This embodiment having a marking portion holder 120 which is integral with the housing 20. This is in contrast to a holder which is attached to the housing, as shown in FIG. 1. These figures show that the holder may either be formed within the housing of a tape measure, or configured for attachment to an existing tape measure. This integral holder 120 rendition is likewise shown in FIGS. 15 and 16.

Figure 9:
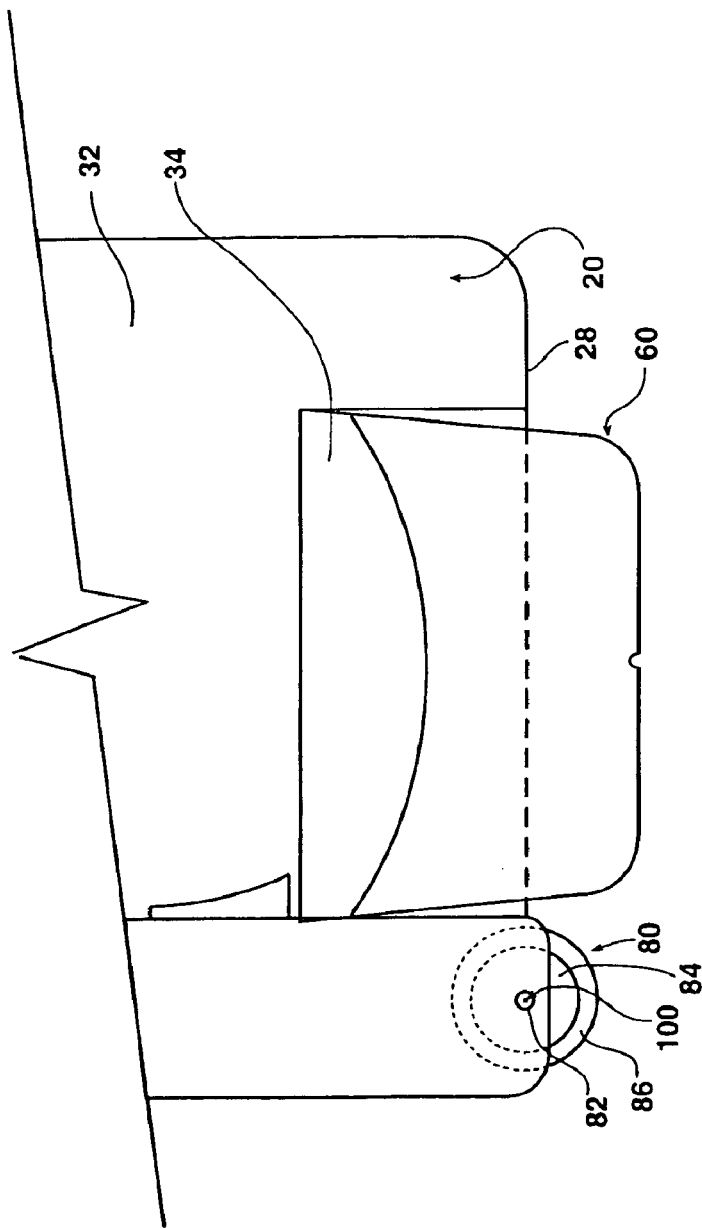
FIG. 9 is a partial, close-up front view of the embodiment shown in FIG. 6.
Figure 8:
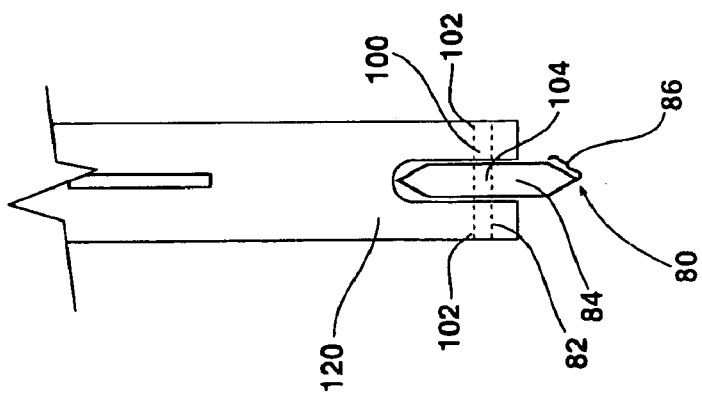
FIG. 8 is a partial side, close-up view of the marking/cutting device of the embodiment shown in FIG. 6.
Figure 14:
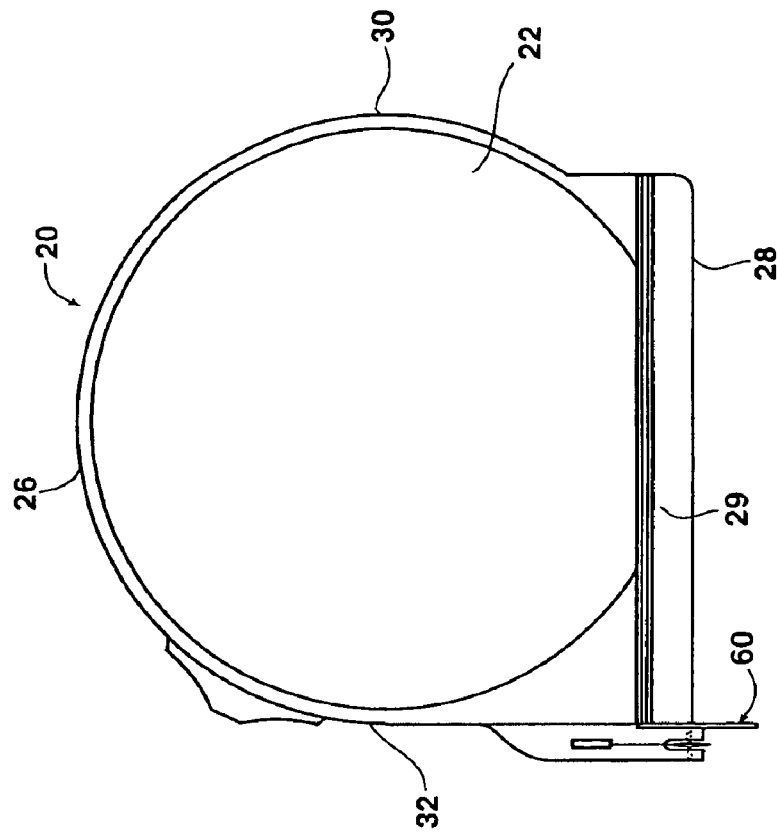
FIG. 14 is a side view of the embodiment shown in FIG. 11 showing the angled bottom of the housing in relationship to the tape tip and the marking portion.
Figure 13:
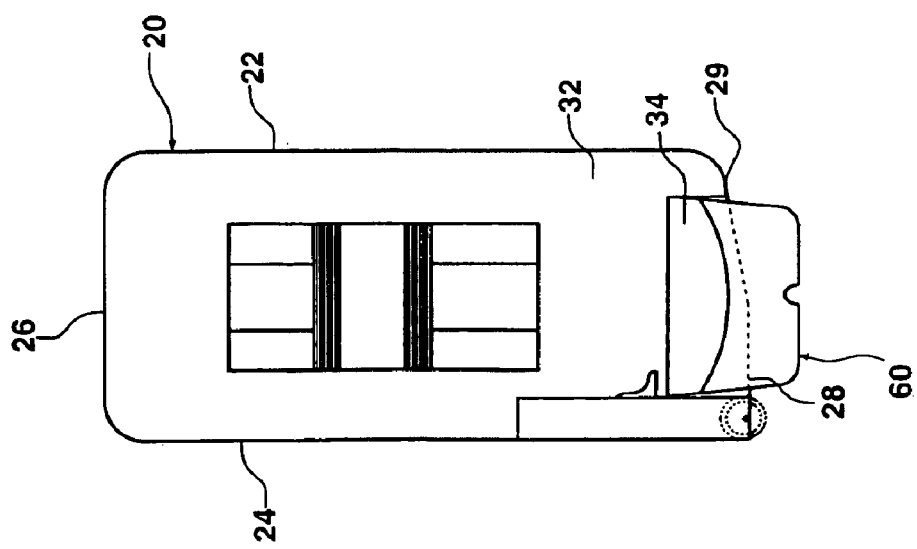
FIG. 13 is a front view of the embodiment shown in FIG. 11 showing the angled bottom of the housing in relationship to the tape tip and the marking portion.

Referring now to FIGS. 8 and 9, the preferred marking portion 80 comprises a circular wheel 84. Other shapes and configurations are also possible. It is preferred that the marking portion 80 be made of a rigid material such as metal, plastic or of a mark making composite, however other materials are also possible. The preferred wheel 84 having an aperture 82 for mating with an axle 100. This axle 100 having axle protrusions or ends 102 configured for rotational engagement with the holder 120. The wheel 84 being preferably mounted at or near the center or middle 104 of said axle 100. Rotational engagement upon an axle is preferred but not required of the present invention.

As seen in FIGS. 8–9 and 31–33, the marking portion 80 may be hardened and/or ground at an angle 86, similar to a glass cutting wheel. This angle 86 may be configured to provide a narrow, accurate mark or may be configured and sharpened to actually serve as a cutting wheel. Thus, "marking" is intended to include marking by cutting, scribing and/or scoring. Also, the impression wheel 84 preferably has a rim 88 for contacting the surface to be marked, at least a portion of this rim extending out of the enclosure/holder 120.

The axle 100 is preferably an elongated cylindrical shape, as shown in FIGS. 8–9. This axle 100 being preferably made of a rigid material such as metal or plastic. The marking portion 80 of FIG. 8, having an axle 100, a middle 104, and two ends 102. The axle 100 may be integral to the marking portion 80 or the holder 120 or the housing 20.

The holder 120 is preferably an elongated square or a right rectangular parallelepiped shape. The holder 120 having a means of attachment to the housing in one embodiment. Examples of such attachment include adhesives, snap fits, magnets, hook-and-loop fasteners, dove-tail joints, etc. In other embodiments, the holder 120 is integral with the housing, being formed into the housing during or after manufacture. The housing preferably has a protruding cursor 124 that is in alignment with a means for holding a marking wheel parallel to the face of the housing and at a precise position to the bottom of the housing.

Figure 24:
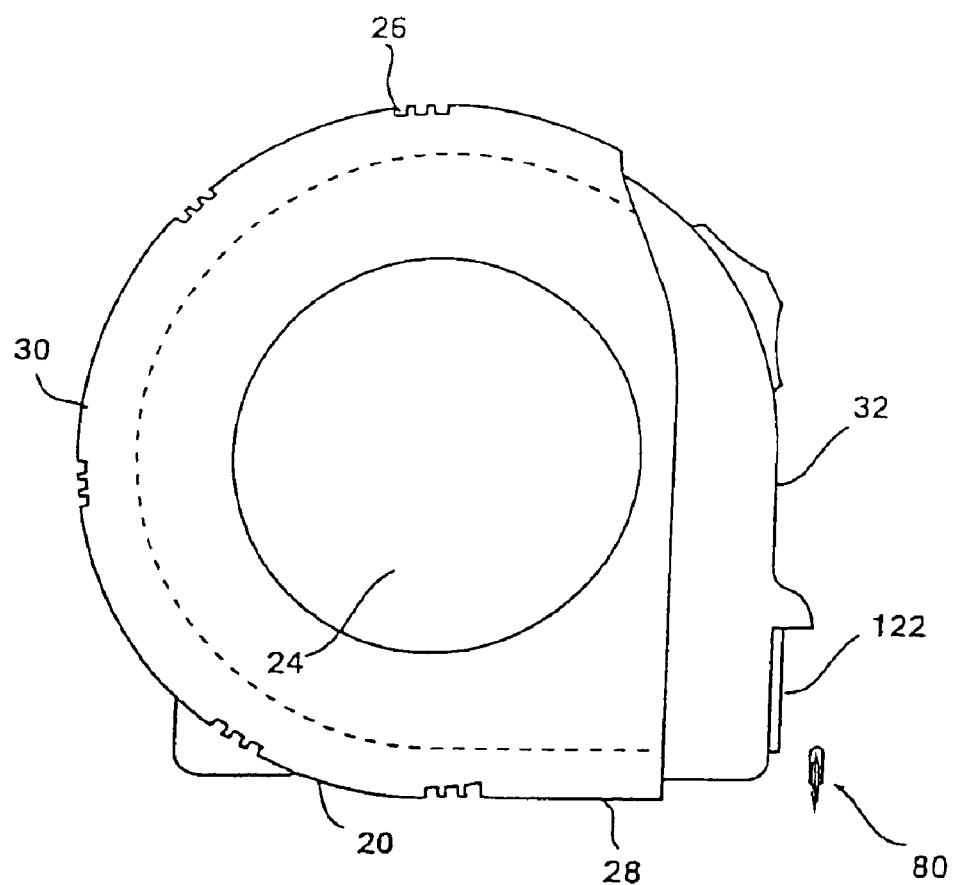
FIG. 24 is a side view of one embodiment of the housing with means for attachment.
Figure 25:
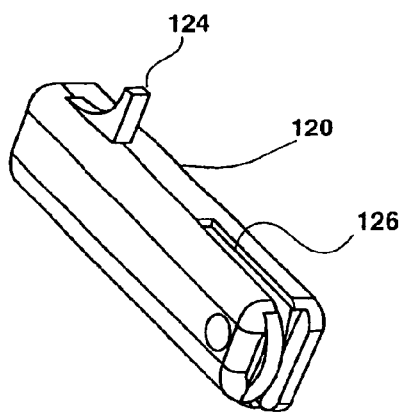
FIG. 25 is a perspective view of one embodiment of the means for holding and the portion.
Figure 26:
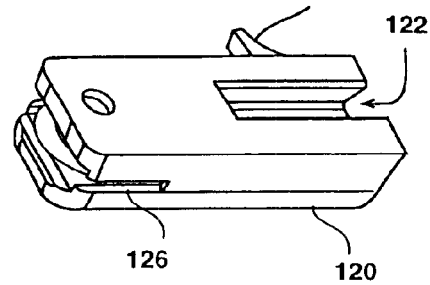
FIG. 26 is a perspective view of the means for holding and the marking portion shown in FIG. 25.
Figure 27:
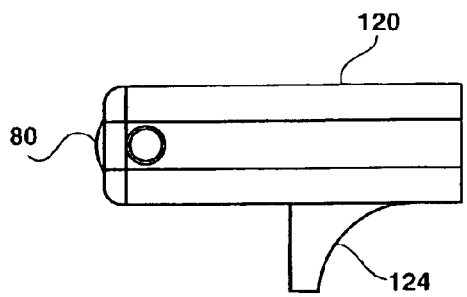
FIG. 27 is a front view of the means for holding and the marking portion shown in FIG. 25.
Figure 28:
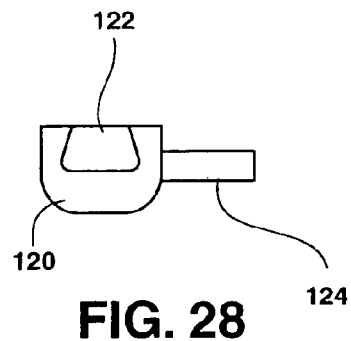
FIG. 28 is a top view of the means for holding and the marking portion shown in FIG. 25.
Figure 29:
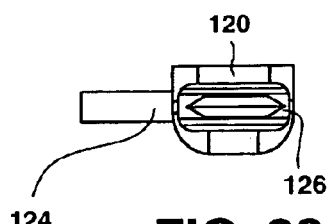
FIG. 29 is a bottom view of the means for holding and the marking portion shown FIG. 25.
Figure 30:
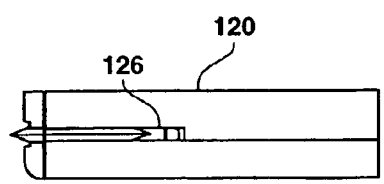
FIG. 30 is a side view of the means for holding and the marking portion shown in FIG. 25.

As shown in FIGS. 25–30, the holder 120 is preferably an elongated square (right rectangular parallelepiped) in shape. Other shapes are also possible. The holder 120 preferably has a cavity 126 for nesting of the marking portion 80. The holder 120 preferably has a means of attachment 122 to the housing 20, one example of which is shown in FIG. 24. The housing 120 preferably has a protruding cursor 124 that is in alignment with a marking wheel of the marking portion 80. This cursor being generally parallel to the face of the housing 20 and generally perpendicular to the means for measuring 40.

Figure 18:
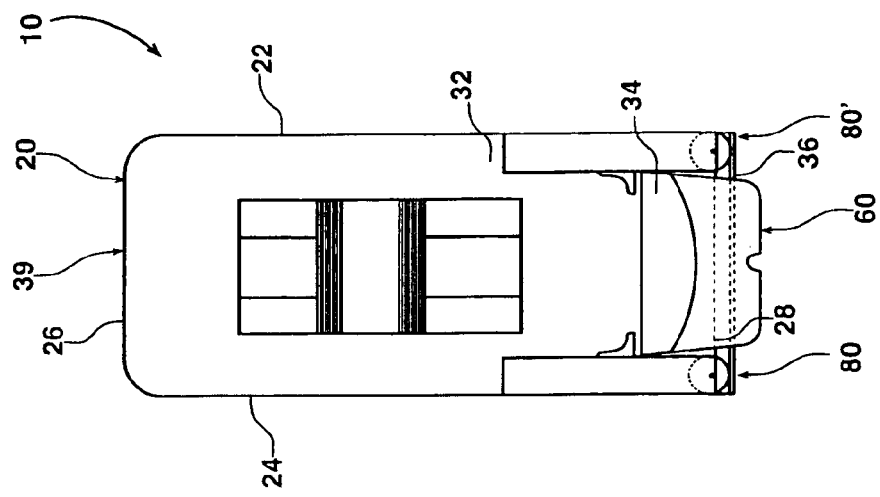
FIG. 18 is a side view of the embodiment shown in FIG. 17 showing a dual marking portion with a flexible housing bottom.

As shown in FIGS. 17 and 18, any means for holding the marking portion 80 perpendicular to the means for measuring 40 in such a way as to allow engagement of the marking portion 80 with the surface to be measured and marked 160 may be utilized as can be appreciated.

As shown in other embodiments, such as FIGS. 11–14, the bottom wall 28 or a portion thereof (partially sloped base) 29 may be angled in such a way as to allow for engagement of the tape tip 60 to the surface being measured 160 without initiating contact of the marking portion 80 until it is intended. Although one angle is shown, many angles, combinations of angles, cutaways, or geometric reveals or shapes could achieve the desired results as can be appreciated. The preferred angle is between 7° and 9°. As shown, it is preferred that this angular relationship of the wall 28 to the partially sloped base 29 be configured along the base length of the housing. However, any base shape that allows for the engagement of the tape tip 162 to the end 62 without engaging the mark making means 80 will work and are also envisioned.

In such a configuration, the marking tape measure comprises a housing 20 for containing a tape and a marking device 80. This housing 20 having a tape opening or aperture 34 and a top wall or side 26 opposite a bottom wall or side. The bottom side comprising a first longitudinal surface (bottom) 28 obliquely joining a second longitudinal surface (partially sloped base) 29. The tape having measuring indicia thereon, and being extendible through the tape opening in a first direction. The remainder of the tape being coiled within the housing. The marking device thus being connected to the housing in alignment with the second longitudinal surface, configured to extend out of the housing adjacent the second longitudinal surface.

In such a manner, a user could hook the tape tip 60 on the edge or end 162 of the surface to be marked and measured 160. With the housing 20 tilted as shown in FIG. 12, the housing could be slid away from the end 162 thereby extending the tape out of the housing without engaging the marking portion 80. When the desired extended length is reached, the user could right the housing 20 as shown in Fig. 11, thereby allowing the marking portion 80 to engage the surface to be measured and marked.

As shown in FIGS. 17 and 18, the housing 20 may have a ramp 36 is flexible when pressure is applied. This ramp 36 prevents the marking of the surface being measured and marked 160 until the user presses downwards on the housing 20 thereby flexing said ramp 36 and allowing the marking portion 80 (80') to contact the surface to be marked. It is preferred that this ramp 36 be comprised of a resilient material able to return to its original shape after such pressure is removed.

Another variation of the housing may include the inclusion of at least one roller or bearing located on the bottom wall of the housing to facilitate perpendicular movement of the housing, to the means for measuring, against the surface to be measured and marked.

The preferred coiled measuring tape utilized with the present invention is an elongated blade formed of a ribbon of metal or composite material. This blade configured to be coiled on a means for a spool (spool means) with a means to retract (retraction means). This tape measure configuration (spool means with retraction means) is well known in the prior art. As shown in FIGS. 5, 19, 20, 22, and 23 of the drawings, the coiled measuring tape 40 comprises an elongated blade 40 formed of a ribbon of metal or composite material coiled on a means for a spool with a means for retraction. It is clearly anticipated that the coiled ribbon measuring tape 40 may be replaced by other means for measuring including digital, GPS, sonar, laser, magnetic, proximity or any other means for determining distance or position.

Referring now to FIGS. 15–16, 42–43, the marking portion 80 may not be a wheel, but may be directional in shape. For instance the elongated point of FIG. 16 or the semicircular shape of the "wheel" 84 of FIG. 15; the semi-ovular shaped "wheel" 184 of FIG. 42; and the semi-hexagonal shaped "wheel" 284 of FIG. 43. In such embodiments, the marking portion 80 would not roll along a surface but be scratched, etched, or scribed across the surface to be marked, either leaving a mark or creating a groove in the surface to be marked. In such an embodiment, the fact that the marking portion is directional in shape, particularly directional generally perpendicular to the length of the base 28 of the housing, the marking portion is able to travel generally only perpendicularly across the surface of the surface to be marked. A point, or a scribe, does not have this ability. Neither does a rectangular pencil lead of a contractor's pencil because the lead (graphite) of the pencil is intended to wear (thereby applying a mark to the surface), thereby removing the ability of such a pencil to be directional in shape. The base 28 itself could have formed therein a directional marking portion, for instance a semi-circular ridge.

The ability to make a mark upon the surface to be marked which is generally perpendicular to the distance measured is key to the preferred embodiment of this invention. This is preferably achieved through the marking portion being directional so that the marking portion will, in use, only apply a mark to the surface which is generally perpendicular to the distance measured (for instance the length of the tape blade). However, other manners may also be utilized to achieve this goal, including manners of restricting the housing itself to perpendicular movement while using a non-directional marking portion, for instance one or more wheels located in the base of the measuring device.

As shown in FIG. 18, a particular embodiment may include two or more marking portion 80, 80'. These marking portion 80, 80' could be separate, as shown, or could be joined together. These marking portion 80, 80' are preferably aligned with one another so that side to side movement of the housing 20 will result in a single line marked upon the surface to be marked. Optionally, these marking portion could be slightly staggered so that a differing line style or thickness could be provided.

Referring back to FIG. 1, it is preferred that the tape measures incorporating the present invention be configured for inclusion with a means for locking the tape blade 140. The means for locking the tape blade 140 has a button section 144 that protrudes to the exterior of the housing. This is likewise shown in FIG. 3. There are many alternate means for locking the tape blade 140, and considered by themselves, are conventional means known in the art and are therefore not shown in detail in the drawings. The means for locking the tape blade 140 is preferably contained in the housing 20 with a button 144 that protrudes to the exterior of the housing 20. This means for locking the tape blade 140 configured to engage and lock the tape blade 40. While the inclusion of the means for locking the tape blade is preferred, its use is not necessary for the operation of the present invention.

The surface to be measured and marked 160 can be of any shape or size material that would commonly be measured with said measuring device. The surface to be measured and marked 160 may also be a structure or a combination of materials. A typical surface to be measured and marked is a piece of dimensional lumber.

The housing 20 and all the housing sub-components integrally form an enclosure. The coiled measuring tape 40 is retractably contained inside the housing enclosure 20 on a hub with the free end of the coiled measuring tape 40 extending through the housing aperture, attaching to the tape tip 60. The tape tip 60 is integral with the free end of the coiled measuring tape 40.

In the preferred embodiments, the marking portion 80 mates with the middle 104 of the axle 100. As such, the axle 100 protrudes from both sides of the marking portion 80. These axle protrusions 102 are able to be received integrally in the walls of the cavity of the holder 126. The preferred holder 120 includes a means for attachment 122 to the housing 20, and is preferably interconnected with the housing 20. Likewise, the holder may be integral with said housing 20, as shown in FIG. 6.

It is preferred that the holder 120 have a protruding cursor 124 that is integral. This cursor 124 indicating to the user the location of the marking portion 80 to the user. Referring now to FIGS. 5, 10 and 11, in use the housing 20 may be brought into contact with the surface to be measured and marked 160. The tape tip 60 is allowed to engage the edge 162 of the surface to be measured and marked 160, while the housing 20 is pulled across the surface to be measured and marked 160 to the desired location as verified by the cursor 124. The marking portion 80 is then engaged by altering the angle of the housing 20, as shown in FIGS. 11 and 12, and applying downward pressure to the marking portion 80. Due to the generally perpendicular attitude of the marking portion 80 to the means for measuring 40, the desired position of the marking portion 80 is maintained. This is due to the nature of the marking portion 80 being directional and configured for moving directionally (side to side) and not forward or backward. This is likewise illustrated in FIGS. 5, 10, 12, 15–16, and 19–22.

Figure 34:
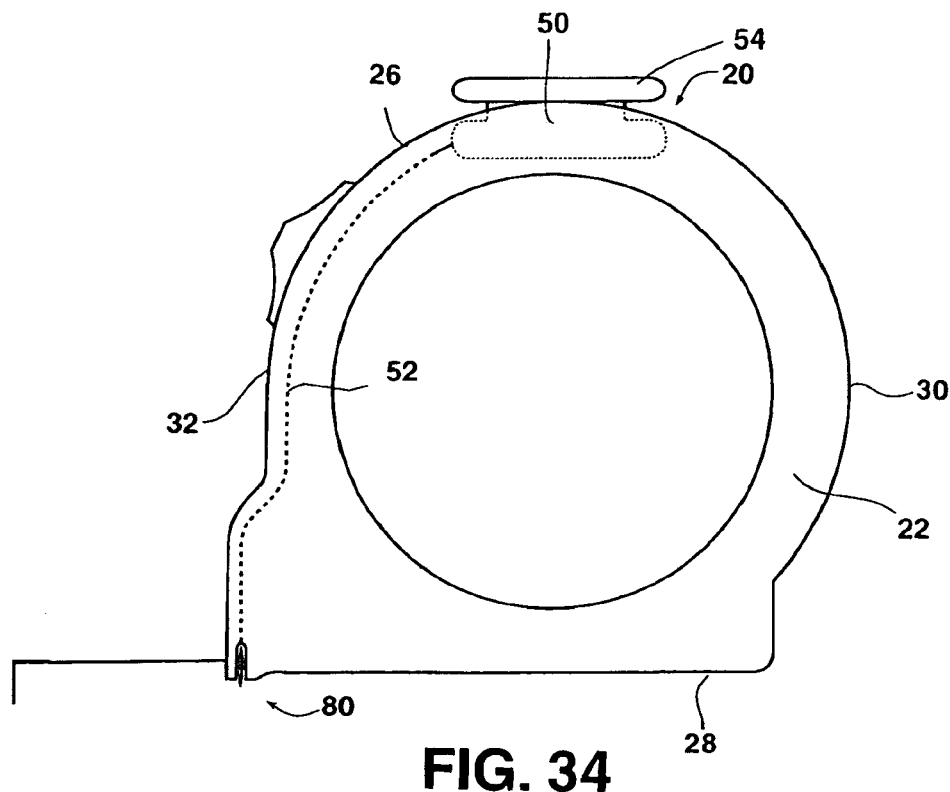
FIG. 34 is a side view of a seventh embodiment of the present invention.
Figure 35:
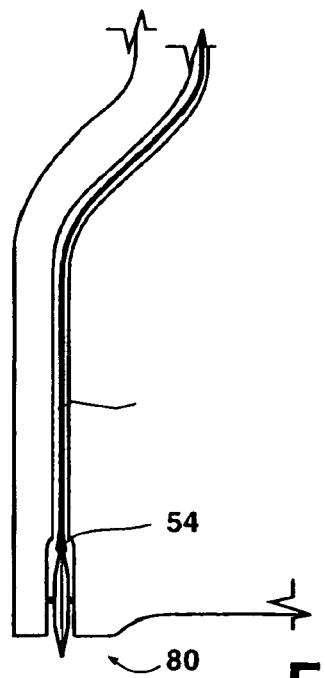
FIG. 35 is a partial, cross-sectional view of the marking portion of FIG. 34.

Referring now to FIGS. 34 and 35, shown is an alternative embodiment of the present invention. In this embodiment, a chamber 50 is provided for containing an amount of a liquid, powder or gel (preferably a liquid) marking substance. This chamber or well 50 preferably provided with a closure 54, such as a lid, for allowing additional quantities of the marking substance to be added to the well. The chamber 50 may be of any size or configuration and may be located inside or outside the housing. It may also be integral with the housing or removable as in a cartridge format.

This marking substance being transmitted to the marking portion 80 through a channel 52, preferably via a wick to an applicator 54 for applying the marking substance, such as an ink, paint, chemical, etc., to the wheel of the marking portion 80. It is preferred that in such an embodiment that a wick be employed to transfer the marking substance with the end of the wick comprising the applicator. The rotation of the marking portion transfers the marking substance to the surface to be marked.

Figure 36:
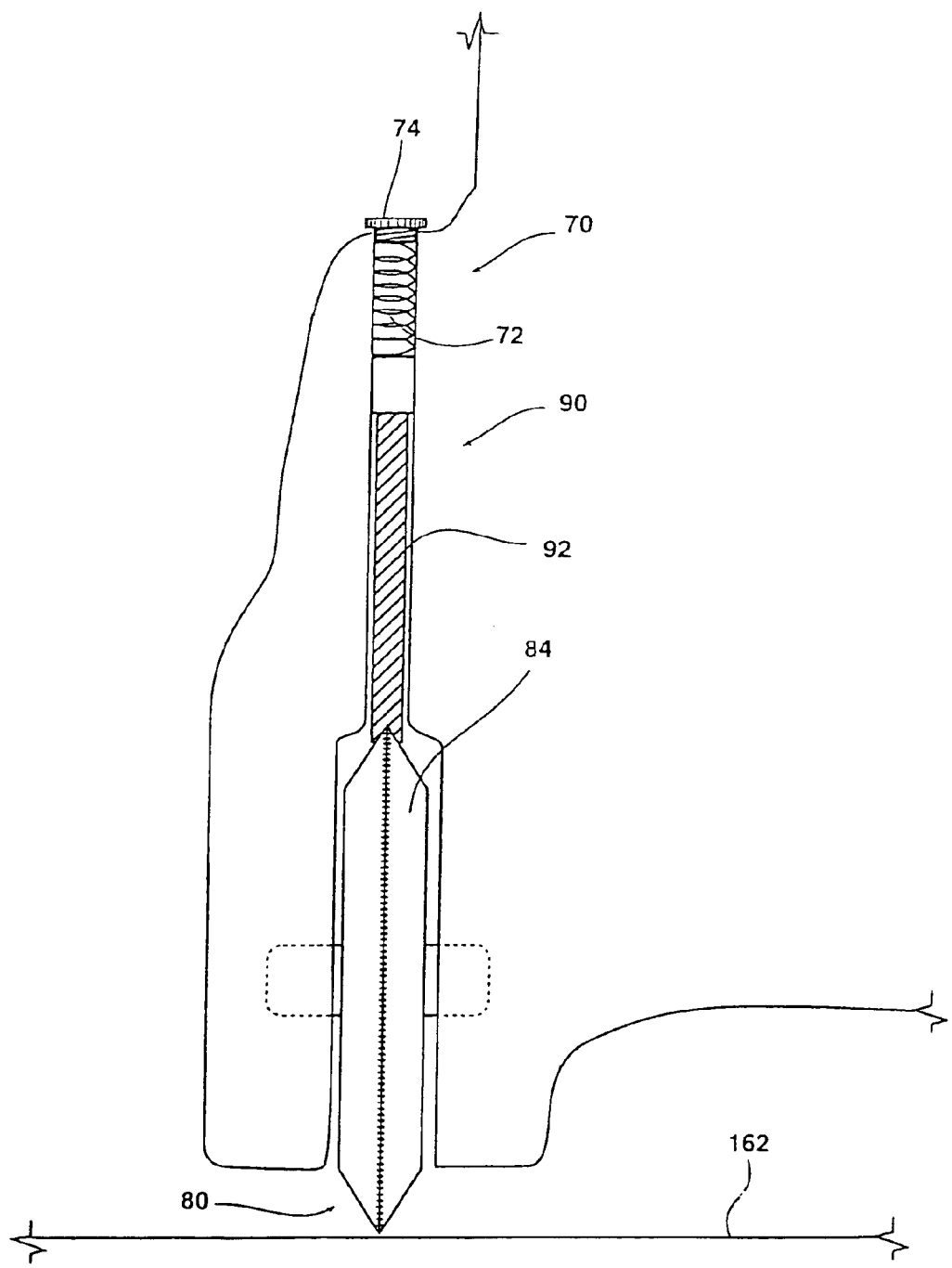
FIG. 36 is a partial, cross-sectional view of another embodiment of a marking portion.

Referring now to FIG. 36, in yet another embodiment of the present invention, a marking applicator could be provided for applying a marking substance, such as graphite, charcoal, wax, chalk, ink, paint, etc., to the marking portion 80. For instance, a pencil lead (graphite) 92 could be held under tension against the surface of the marking portion 80, particularly the wheel 84, which contacts the surface to be marked 160. Thus, rotation of the wheel 84 of the marking portion against the surface to be marked 160 also results in rotation of the wheel 84 of the marking portion against the indicia (marking) applicator 90. This results in the transmission of the marking substance from the marking applicator 90 onto the wheel 84 of the marking portion. Then, continued movement of the marking portion 80 against the surface to be marked 160 results in the transfer of the marking substance to the surface to be marked from the marking portion. Thus, for instance, utilization of the present invention could result in the creation of an ink line along the directional track of the marking portion.

Additionally, the marking portion utilized with the marking applicator could comprise or be comprised at least partially of, a rubber material or a porous material allowing for easier application of such a marking substance. Such a rubber or porous material would more easily hold and carry to the surface to be marked the marking substance, for instance chalk.

Additionally, the marking applicator could be selectively engaged or disengaged by the operator through use of an engagement/disengagement means 70. This would allow the operator or user of the present invention to decide whether to also or instead apply a marking substance to the surface marked. For instance, a spring mechanism 72 could be utilized whereby through pushing a button 74 on the coiled measuring tape the marking applicator could be activated or deactivated.

As the wheel is rolled on the surface to be marked, ink another marking material or substance is deposited on the wheel. The wheel, as it rolls, deposits the marking material on to the surface to be marked.

The housing 20, the holder 120, and the marking portion 80, may be molded, cast or machined as one component, preferably from a rigid material such as metal, plastic or a mark making composite, for instance magnesium.

Figure 37:
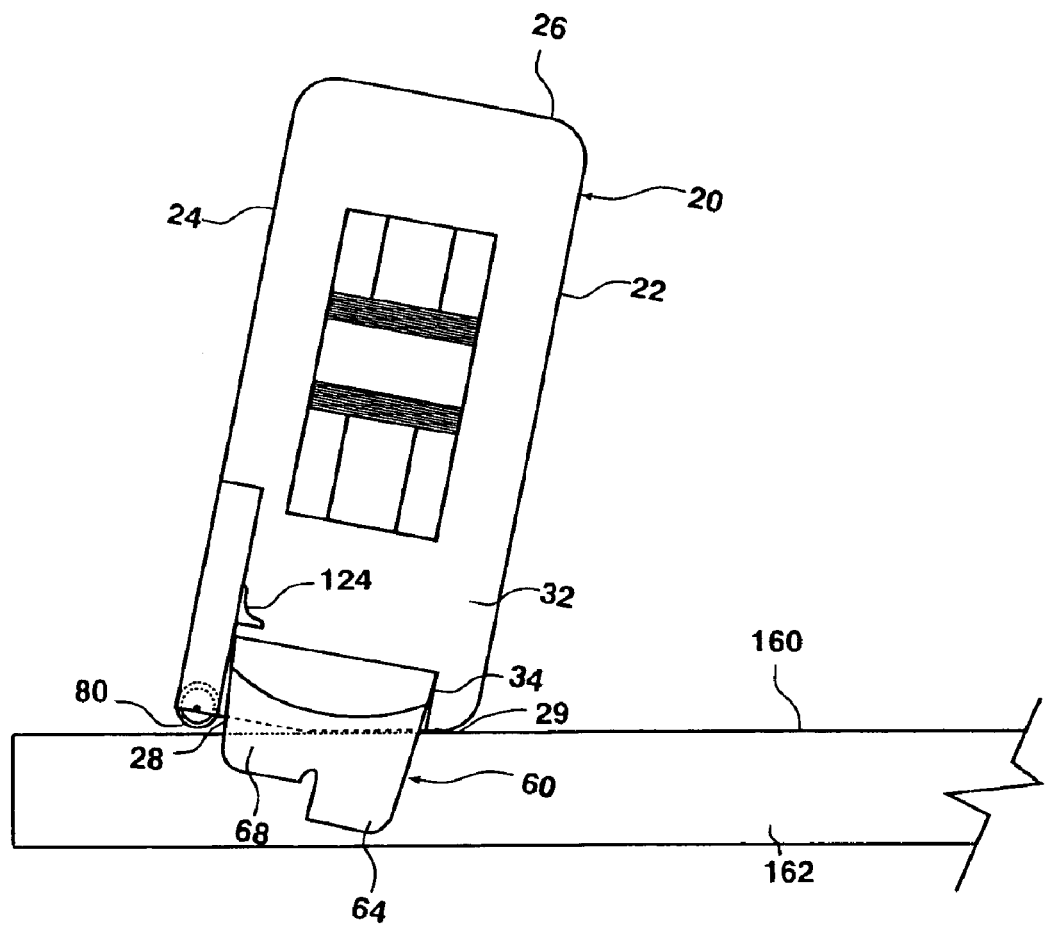
FIG. 37 is a front view of another embodiment of the present invention shown in position to mark.

Referring now to FIG. 37, shown is another embodiment of the present invention. This embodiment having an asymmetrical tape tip 60. This tape tip 60 having one side 64 longer than the other side 68. In such a manner, utilization of the present invention is easier, in that the housing 20 can be tilted as shown in the figure with the tape hook 60 one side 64, being elongated, more easily engaging the end. 162 of the surface to be marked and measured 160, thereby allowing the device to be utilized without engaging the marking device 80.

Figure 38:
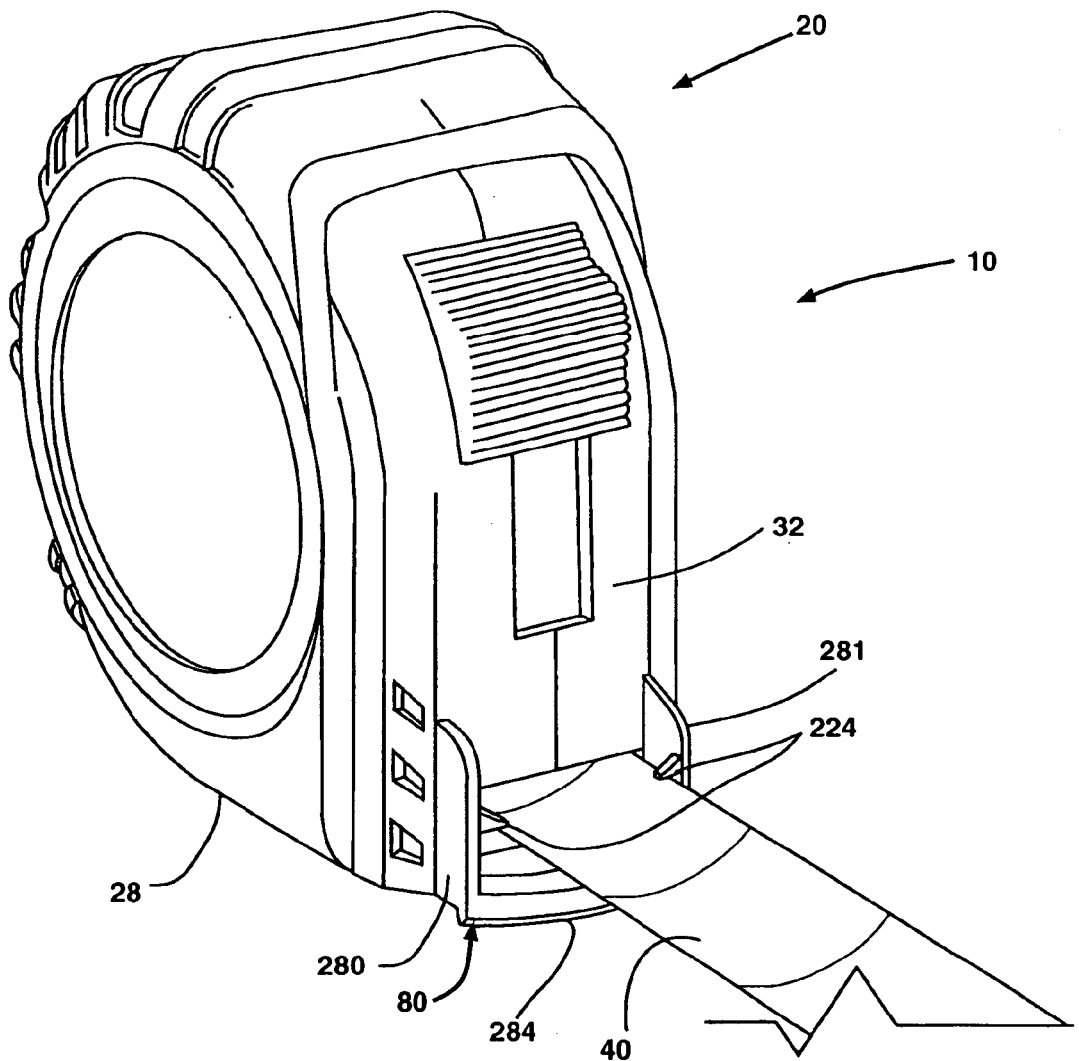
FIG. 38 is a perspective view of a tape measure bearing yet another embodiment of a means of marking of the present invention.
Figure 39:
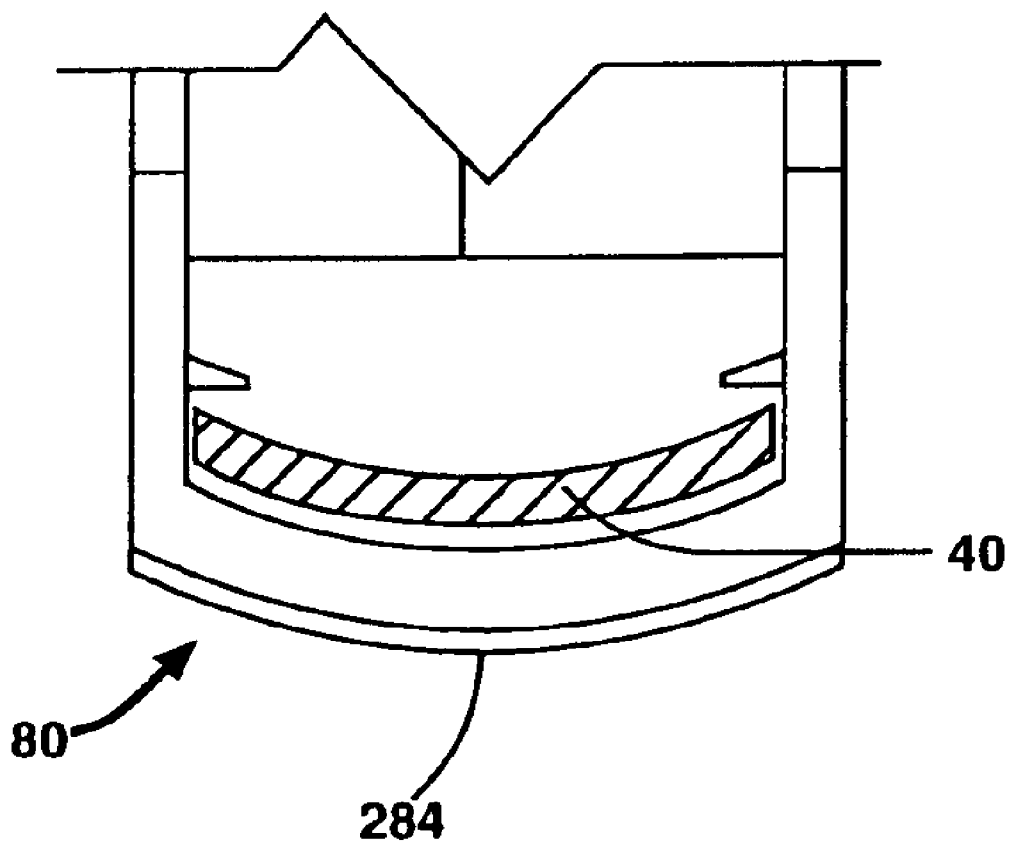
FIG. 39 is a partial, first end view of the tape measure of FIG. 39.
Figure 40:
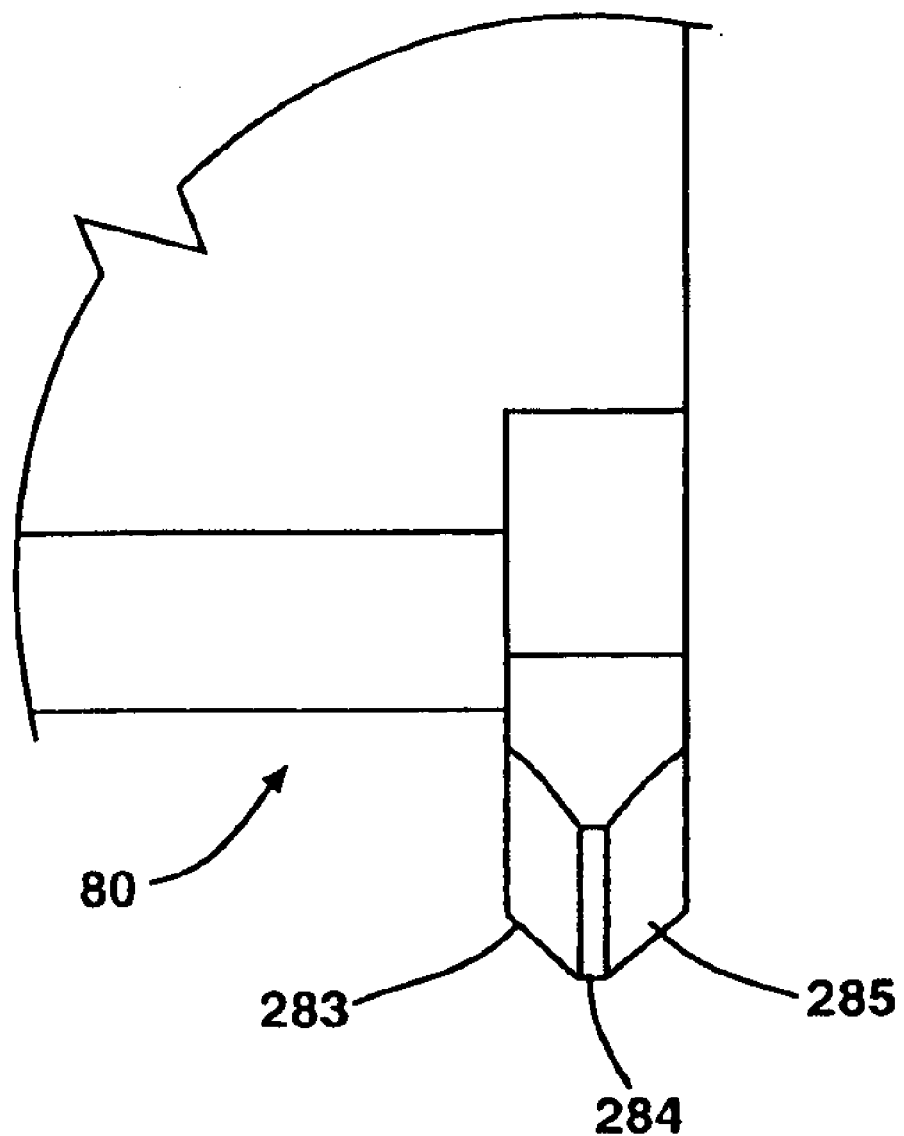
FIG. 40 is a partial, side view of the tape measure means of marking of FIG. 38.

Referring now to FIGS. 38–40, shown is another embodiment of the present invention. This embodiment comprising a tape case housing 20 having integrally built therein a directional marking portion 80. This directional marking portion 80 comprising a marking portion 284 extending downwards there from configured for marking a surface to be marked. The preferred location for such a marking portion 284 being the bottom wall or base 28 of the housing 20. Other locations are likewise envisioned.

The major benefits to such an embodiment including the fact that there are no additional moving parts involved in the marking portion and therefore less of a chance of failure or wear, and because the portion can be a part of the case itself, there is little, if any, additional manufacturing cost in that no additional assembly, labor or mold charges are required.

In the embodiment shown, this marking portion 284 comprises a curved extension away from the bottom wall 28 of the tape case housing 20. More specifically, the embodiment showing a pair of forwardly extending flanges 280, 281 extending from the front wall 32 with the marking portion 284 extending downwards from these flanges away from the bottom wall 28. The marking portion 284 in alignment with cursor(s) 224. Thus, in said embodiment, the marking portion 284 preferably extends either downwards from the bottom wall or below the plane of at least a portion of the bottom wall 28. Additionally, the marking portion could be above said plane, requiring the user to tilt the tape case in use.

The marking portion can comprise anything from a ridge, ledge, rim, knob, protrusion(s), lip, overhang, etc., extending from the housing 20. The preferred shape of the portion being generally crescent shaped, this crescent shape permitting directional movement of the marking portion. This crescent shape preferably generally convex and integral to the tape case. However, other shapes are also envisioned.

It is preferred that the directional marking portion 80 be comprised of a material which is configured for marking. Such a material can include plastics, metals and ceramics. A preferred material is magnesium or a magnesium alloy. It is foreseen that the entire tape case, including the marking portion can be made of such a marking material (thereby being comprised of the same material as the tape case), or in other embodiments, just the marking portion being made of the marking material.

It is preferred that the housing 20 shown having a cursor(s) 224 extending from and adjacent to the marking portion 284. This cursor(s) for allowing a user to visually determine the location at which the present invention will mark the surface to be marked.

Figure 41:
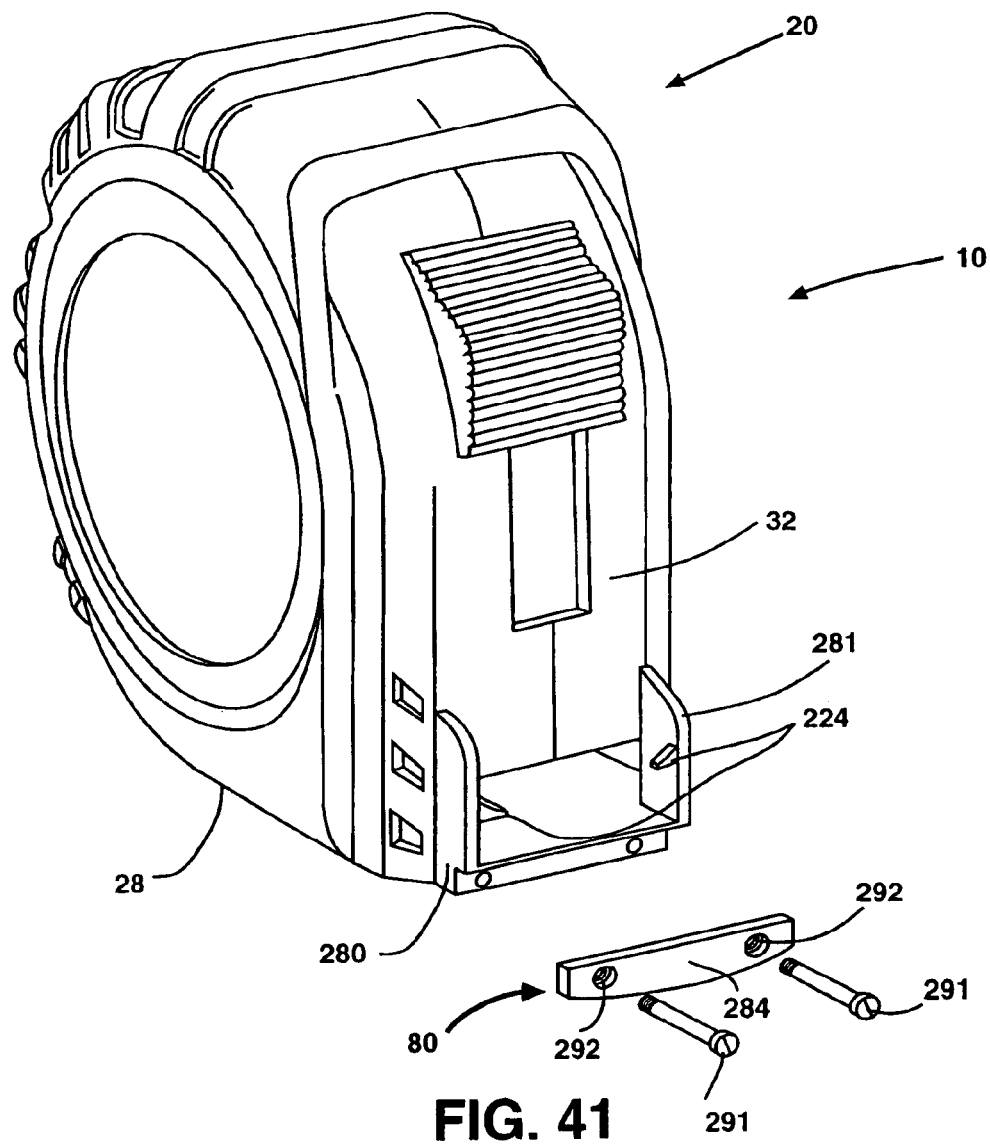
FIG. 41 is a perspective view of another embodiment of the present invention.
Figure 42:
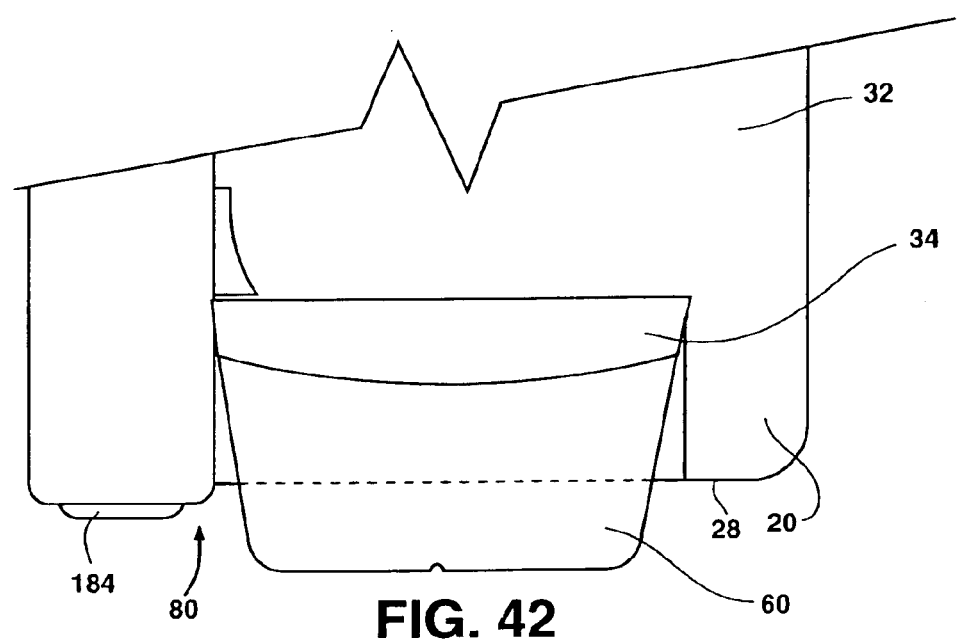
FIG. 42 is a first side view of another directional marker of the present invention.
Figure 43:
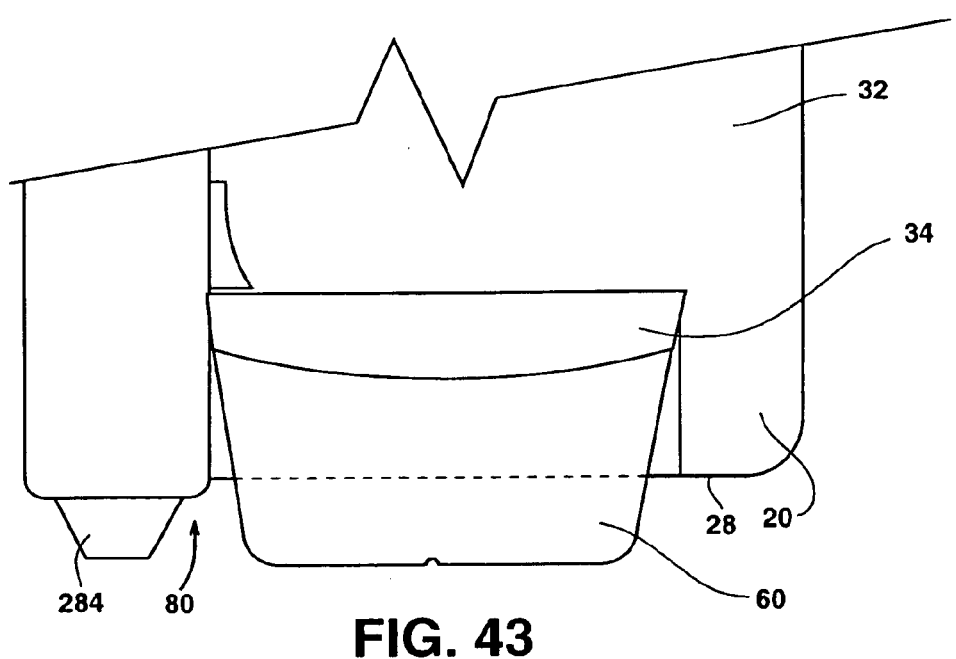
FIG. 43 is a first side view of yet another directional marker of the present invention.
Figure 44:
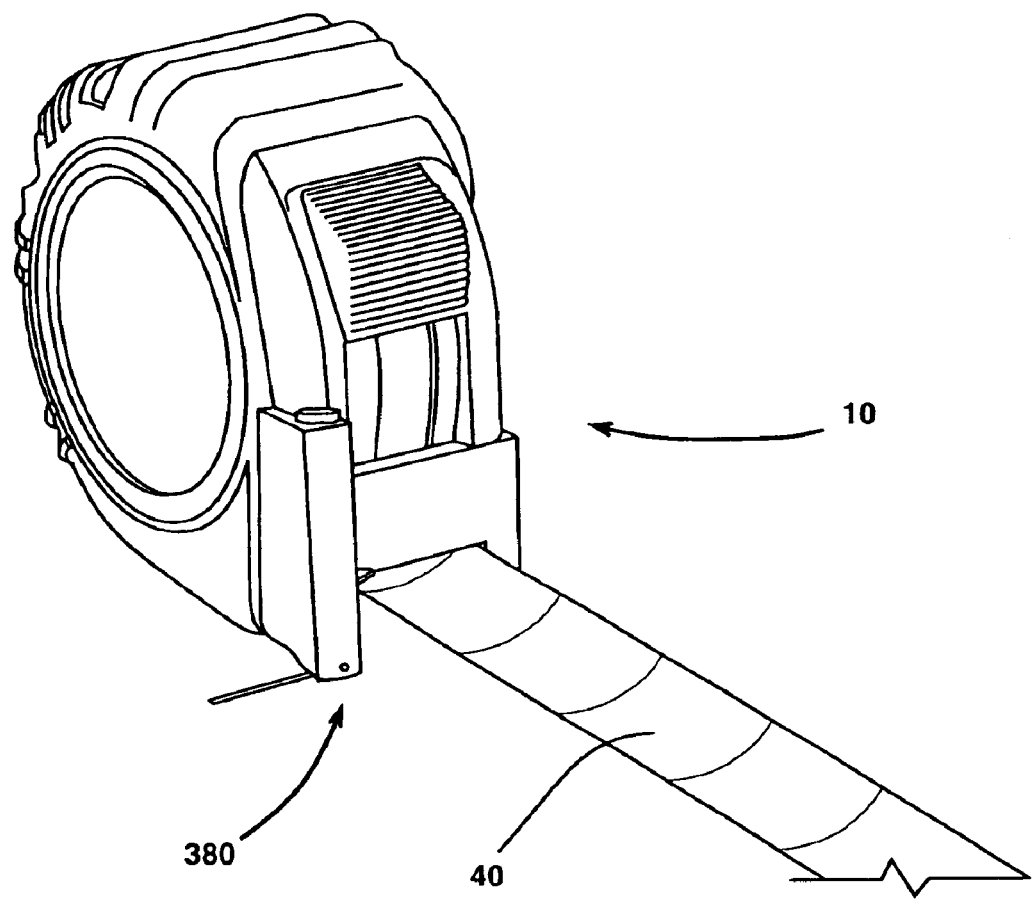
FIG. 44 is a perspective view of one embodiment of a pen-style directional marker of the present invention.
Figure 47:
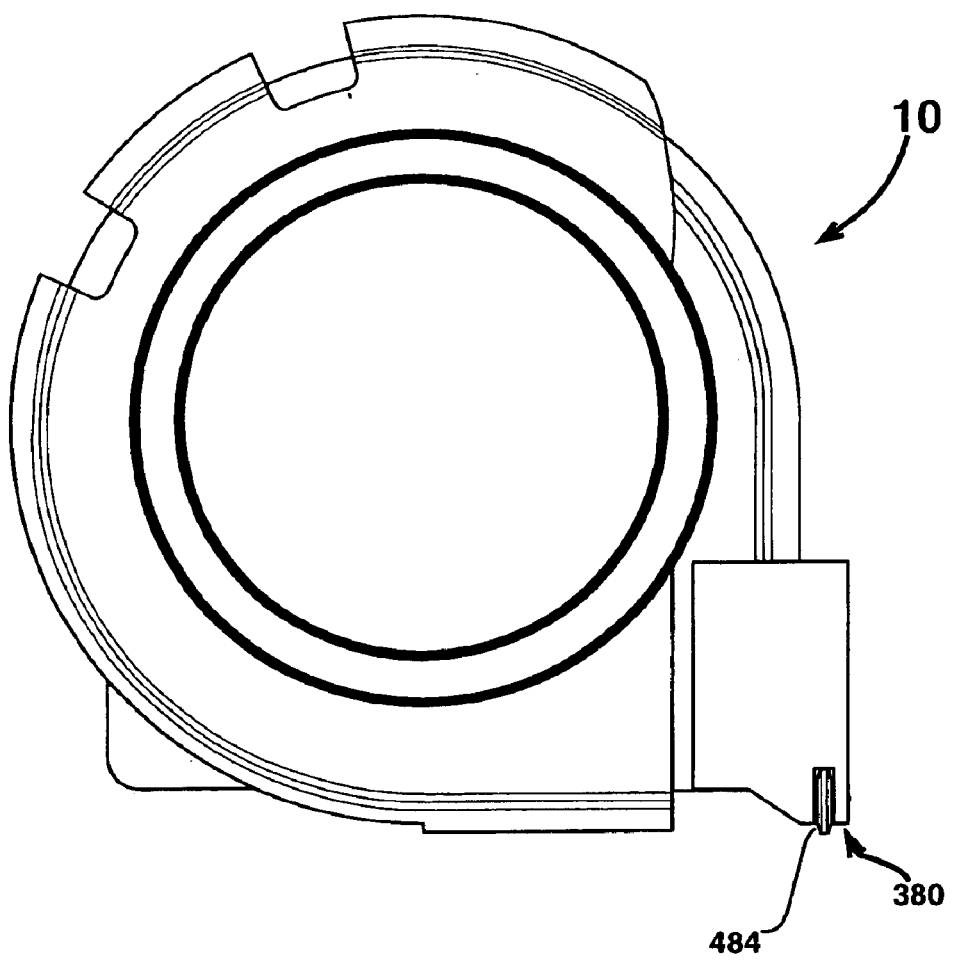
FIG. 47 is a side view of a second embodiment of a pen-style directional marker of the present invention.

While it is preferred that the marking portion be an integral part of the housing, optionally, the portion could be removable and replaceable so that when and if the portion becomes worn and/or consumed, the user could recondition the tape measure by replacing the portion. Such an embodiment is shown in FIG. 41. Such a replaceable portion 284 being fastened to the housing through use of a fastener(s) 291. This fastener(s) 291 preferably extending through a mounting hole(s) 292 located in the marking portion 284. Likewise, other fasteners or means of fastening may be used to attach the replaceable portion 284 to the housing, including but not limited to fasteners, adhesives, welds, friction fits, snap fits, hook-and-loop, etc.

Referring now to FIGS. 44–47, shown are two embodiments of a "pen-style" directional marker(s) of the present invention. This embodiment having what is referred to as a "pen-style" directional marker 380. The term "pen-style" is used to indicate any applicator of a liquid or gel marking substance 111 to the wheel(s) 484, including but not limited to the specific embodiment described herein. Non-exclusive examples of suitable marking substances for this embodiment include, but are not limited to: inks, paints, dyes, liquid graphite, colored liquid materials appropriate for any and all trade applications, visible ink, "invisible" ink, disappearing ink, permanent inks, erasable inks, etc. It is preferred that the marking substance be interchangeable, refillable and/or replaceable. This directional marker (as with all of the other embodiments of the present invention) could be integral to the tape case or could be a separate component which is configured for attachment to the tape case or other structure/location.

The wheel is preferably configured to, after application of the marking indicia/substance to the wheel, subsequently rotationally transfer the marking indicia to the surface to be marked thereby creating at least one mark. It is preferred that the wheel be generally circular and disposed generally perpendicular to the first direction (the direction the tape measure's blade extends). The wheel having a circumference defining a rim, this rim having a width, wherein said rim width is generally perpendicular to the rotation of the wheel.

The marking device/directional marker 380 attaching preferably to the front of a tape measure 10 case. Such a tape measure having a tape blade 40 extendable there from. The preferred embodiment utilizing a "ball-point pen" style applicator 90 for applying the marking substance 111 to the wheel 484. The applicator 90 having a reservoir 112 for holding a supply of the marking substance. The marking substance within the applicator 90 is preferably interchangeable, refillable and/or replaceable. For that reason, in this embodiment a cap 114 is provided for allowing the applicator 90 to be removed. A spring device 113 may be present for biasing the applicator against the wheel or this may be achieved through other means. Some such spring biased applicators may be "clicked" or otherwise configured to be selectively engaged/disengaged against the wheel.

As can be seen particularly in the close-up view of FIG. 46, the applicator 90 having a spherical ball 285. In this embodiment, the applicator is a traditional "ball-point pen" style applicator as is known in the art. However, other types of applicators are also envisioned for applying the marking substance to the wheel. A benefit to this style marking device is the fact that as long as the wheel is not revolving, the marking substance is held separate of the external portion of the tape measure and therefore the marking substance will not leak or otherwise be transferred out of the marker. This prevents stray marks and the mess often associated with such devices. An ideal ball-point pen comprising a spherical writing ball rotationally disposed in and partially exposed from a pen tip, this ball in fluid communication with a marking indicia reservoir.

The wheel 484 is preferably, but not necessarily, disposed on an axle 116 and configured to engage the ball 285 via a circumvolving groove or channel 485 within the rim of said wheel. This groove facilitating the rolling of the wheel along the wheel face, thereby assisting in the transfer of the marking substance to the wheel face/rim for application to the surface to be measured and marked. This groove is preferably "V-shaped", however other configurations are also possible, including but not limited to U-shaped, W-shaped, etc. Additionally, no such channel may be present in some embodiments of the present invention. Instead, the ball would merely roll against the wheel face, applying the marking substance directly thereon. In such an instance, the wheel face may contain abrasions, cuts, indentions, pits, holes, etc. for assisting the wheel in obtaining marking substance from the pen and for carrying the marking substance to the surface to be measured and marked.

In an additional embodiment, a portion of the wheel itself could travel a portion of the pen configured for storing the marking indicia, thereby applying the marking indicia/substance to the wheel without using a spherical ball. In another embodiment, the spherical ball (omni-directional) with a roller (directional) or other directional means. Such a directional roller could be used in lieu of a wheel.

Figure 48:
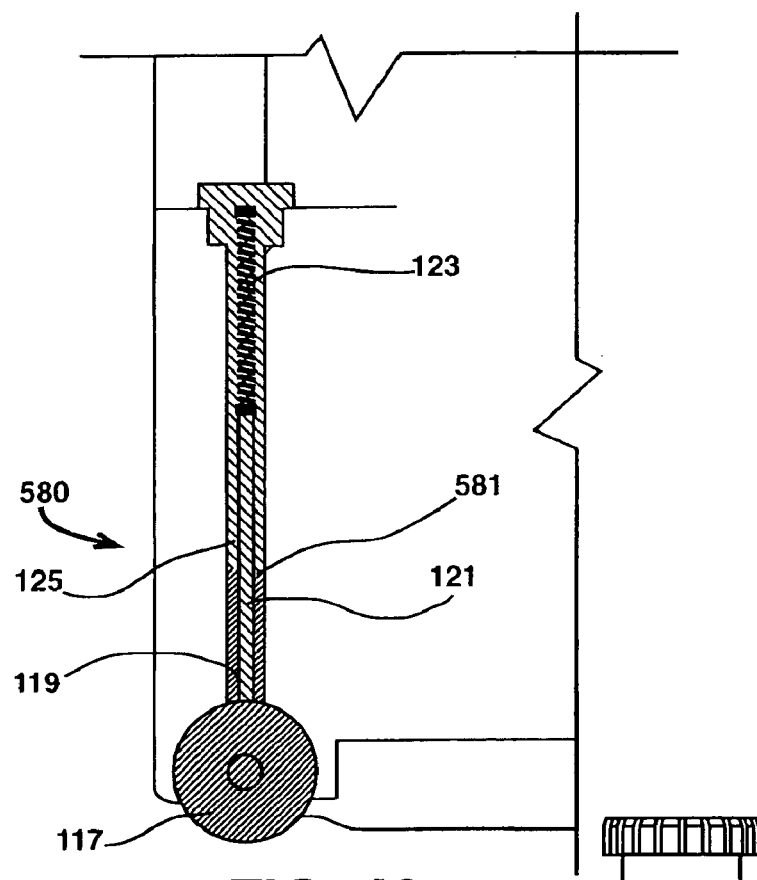
FIG. 48 is a partial, sectional view of one embodiment of a mechanical pencil-style directional marker of the present invention.
Figure 49:
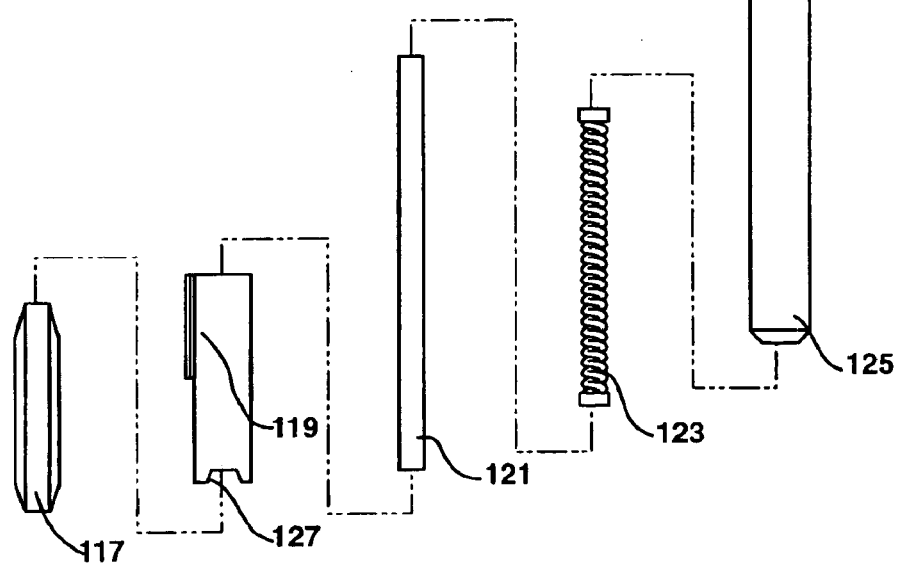
FIG. 49 is an exploded view of the embodiment of FIG. 48.
Figure 50:
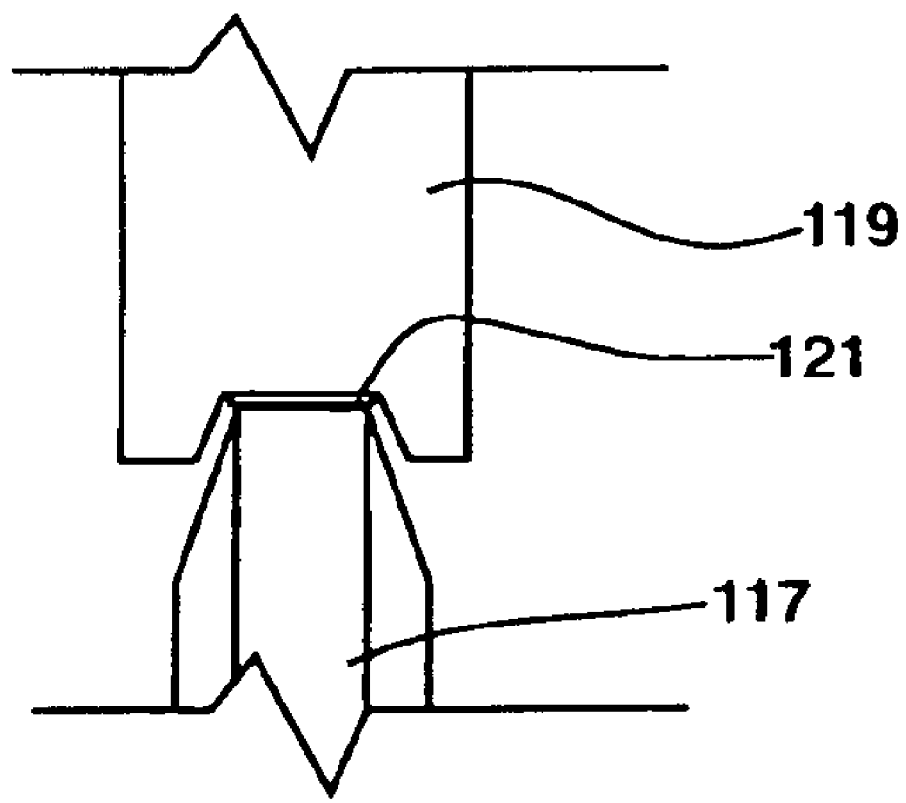
FIG. 50 is a partial, close up view of a second embodiment of a mechanical pencilstyle directional marker of the present invention.

Referring now to FIGS. 48–50, shown is another embodiment of the present invention. In this embodiment, the marking device (marking indicia applicator) applies a solid marking substance to the wheel. In one such embodiment, applicator is similar to a mechanical pencil, dispensing a graphite solid marking substance. Other types and configurations of applicators are envisioned, the term "mechanical pencil" not intended to be exclusive to mechanical pencil mechanisms, but intended to include any solid marking substance dispenser. Other types of solid marking substances are also envisioned, including but not limited to graphite, crayon, colored pencil, wax pencil, lead, inks, dyes, etc. The term "solid" intended to include both solid and semi-solid substances.

In one embodiment, the marking device is merely biasing a solid/semi-solid stick of marking substance against the wheel, the marking substance thus applied to the wheel, the wheel then rotationally transferring the marking substance to the surface to be measured and marked as a line.

In the embodiment shown in FIGS. 48–50, the applicator 580 is configured for applying a solid marking substance 121 to the wheel 117. In the embodiment shown, the applicator has a marking housing 119 therein. This marking housing 119 for aligning the solid marking substance 121 with the wheel 117. This marking housing preferably containing a passageway there through for the marking substance to pass. The marking housing further configured, at its lower end, for mating with the wheel 117 via a notch 127 formed therein (as specifically shown in FIG. 50). In such a manner, the marking substance 121 is effectively applied to the rim of the wheel.

A channel 581 for receiving therein the components of the applicator 580 is preferably defined within the applicator housing. When installed, inserted into this channel (as shown in FIG. 48) is the marking housing 119, the solid marking substance 121, a spring 123 for biasing (holding in frictional engagement) the marking substance against the wheel, and a cap/spring housing 125 for holding the marking substance in engagement with the wheel via the spring. While this is the preferred embodiment, obviously other embodiments are envisioned and are included within this disclosure. Likewise in this embodiment, as long as the wheel is not rolled, the marking substance will not leak out of the housing or erroneously be applied to a surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A marking tape measure comprising:
    a housing for containing a measuring tape therein, said housing comprising a front wall defining a tape blade aperture;
    a measuring tape having measuring indicia thereon, said measuring tape extendable through said tape blade aperture, wherein said measuring tape is configured to be extendible in a first direction out of the housing with the remainder of the tape being coiled in said housing, wherein said wheel is disposed generally perpendicular to said first direction; and
    a marker attaching to said housing, said marker comprising at least one wheel for rotationally applying a mark to a surface to be marked and at least one marking indicia applicator for applying a marking indicia to said wheel, wherein said mark is generally perpendicular to said first direction, wherein said marking indicia applicator is configured to transfer said marking indicia to said wheel, wherein said wheel subsequently rotationally transfers said marking indicia to said surface to be marked thereby creating said mark.

2. The marking tape measure of claim 1, wherein said wheel is disposed on an axle.

3. The marking tape measure of claim 1, wherein said wheel is generally circular, having a circumference defining a rim, said rim having a width.

4. The marking tape measure of claim 3, wherein said rim width is generally perpendicular to the rotation of said wheel.

5. The marking tape measure of claim 4, wherein said marking indicia applicator comprises a ball-point pen style applicator for applying a fluid marking indicia.

6. The marking tape measure of claim 5, wherein said ball-point pen style applicator comprises a writing ball rotationally disposed in and partially exposed from a pen tip, said ball in fluid communication with a marking indicia reservoir.

7. The marking tape measure of claim 6, wherein said partially exposed writing ball is configured to roll along said wheel rim thereby communicating ink to said wheel rim.

8. The marking tape measure of claim 4, wherein said marking indicia applicator comprises a mechanical pencil.

9. The marking tape measure of claim 8, wherein said mechanical pencil comprises a solid marking indicia configured to be held in frictional engagement with said wheel rim, wherein rotation of said wheel causes deposition of said solid marking indicia upon said wheel rim, wherein further rotation of said wheel results in transfer of said solid marking indicia as a mark to a surface to be marked.

10. The marking tape measure of claim 3, wherein said rim width defines a circumvolving channel.

11. The marking tape measure of claim 10, wherein said marking indicia applicator comprises a ball-point pen.

12. The marking tape measure of claim 11, wherein said ball-point pen comprises a writing ball rotationally disposed in and partially exposed from a pen tip, said ball in fluid communication with a marking indicia reservoir.

13. The marking tape measure of claim 12, wherein said partially exposed writing ball is configured to roll along said channel thereby communicating ink to said wheel rim.

14. The marking tape measure of claim 1, wherein said marker is integral to said housing.

15. A marking tape measure comprising:
    a housing for containing a measuring tape therein, said housing comprising a front wall defining a tape blade aperture;
    a measuring tape having measuring indicia thereon, said measuring tape extendable through said tape blade aperture in a first direction out of the housing with the remainder of the tape being coiled in said housing; and
    a marker attaching to said housing, said marker comprising:
        at least one wheel for rotationally applying a mark to a surface to be marked, wherein said wheel is configured to rotationally transfer said marking indicia to said surface to be marked, said wheel disposed generally perpendicular to said first direction, wherein said wheel is generally circular, having a circumference defining a rim, said rim having a width, said rim width is generally perpendicular to the rotation of said wheel, said rim width defining a circumvolving channel; and
        at least one marking indicia applicator configured to apply a liquid marking indicia to said wheel, wherein said marking indicia applicator comprises a ball-point pen style applicator having a partially exposed writing ball configured to roll along said channel thereby communicating said liquid marking indicia to said wheel rim.

16. A marking tape measure comprising:
    a housing for containing a measuring tape therein, said housing comprising a front wall defining a tape blade aperture;
    a measuring tape having measuring indicia thereon, said measuring tape extendable through said tape blade aperture in a first direction out of the housing with the remainder of the tape being coiled in said housing; and
    a marker attaching to said housing, said marker comprising:
        at least one wheel for rotationally applying a mark to a surface to be marked, wherein said wheel is configured to rotationally transfer said marking indicia to said surface to be marked, said wheel disposed generally perpendicular to said first direction, wherein said wheel is generally circular, having a circumference defining a rim, said rim having a width, said rim width is generally perpendicular to the rotation of said wheel; and
        at least one marking indicia applicator configured to apply a solid marking indicia to said wheel, said marking indicia applicator comprising a mechanical pencil comprising a rod of solid marking indicia configured to be held in frictional engagement with said wheel rim, wherein rotation of said wheel causes deposition of said solid marking indicia upon said wheel rim, wherein further rotation of said wheel results in transfer of said solid marking indicia as a mark to a surface to be marked.

* * * * *